(12) United States Patent
Redmond et al.

(10) Patent No.: US 6,914,868 B1
(45) Date of Patent: Jul. 5, 2005

(54) LOW PROFILE OPTICAL HEAD

(75) Inventors: Ian Redmond, Boulder, CO (US);
Bernard Bell, Lafayette, CO (US);
David L. Blankenbeckler, Longmont, CO (US); Michael F. Braitberg, Boulder, CO (US); Robert D. Freeman, Erie, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 0 days.

(21) Appl. No.: 09/540,657

(22) Filed: Mar. 31, 2000

Related U.S. Application Data

(63) Continuation-in-part of application No. 09/457,104, filed on Dec. 7, 1999.

(51) Int. Cl.[7] .................................................. G11B 7/00
(52) U.S. Cl. ................................. 369/112.01; 369/120
(58) Field of Search ........................ 369/44.12, 112.01, 369/112.19, 112.27, 121, 120, 44.11, 44.29, 44.35, 30.17, 53.25, 53.15, 53.23, 44.32

(56) References Cited

U.S. PATENT DOCUMENTS

| | | | |
|---|---|---|---|
| 3,530,441 A | 9/1970 | Ovshinsky | 340/173 |
| 3,868,651 A | 2/1975 | Ovshinsky | 340/173 |
| 3,983,542 A | 9/1976 | Ovshinsky | 340/173 |
| 4,205,387 A | 5/1980 | Ovshinsky et al. | 364/900 |
| 4,542,495 A | 9/1985 | Ziegler et al. | 369/273 |
| 4,571,718 A | 2/1986 | Cahill et al. | 369/291 |
| 4,577,289 A | 3/1986 | Comerford et al. | 364/900 |
| 4,647,944 A | 3/1987 | Gravesteijn et al. | 346/1.1 |
| 4,710,899 A | 12/1987 | Young et al. | 365/113 |
| 4,872,156 A | 10/1989 | Steenbergen et al. | 369/275 |
| 4,945,530 A | 7/1990 | Sandell et al. | 369/291 |
| 4,953,209 A | 8/1990 | Ryder, Sr. et al. | 380/23 |
| 4,960,680 A | 10/1990 | Pan et al. | 430/346 |
| 5,060,106 A | 10/1991 | Davis et al. | 360/133 |
| 5,063,558 A | 11/1991 | Takahashi | 369/291 |
| 5,073,889 A | 12/1991 | Rayner | 369/291 |

(Continued)

FOREIGN PATENT DOCUMENTS

| | | |
|---|---|---|
| EP | 0 886 352 A1 | 12/1998 |
| EP | 0951015 A2 | 4/1999 |
| JP | 10208279 A | 8/1998 |
| JP | 11176744 | 7/1999 |
| WO | WO 99/49455 | 3/1999 |
| WO | WO 00/33121 | 6/2000 |
| WO | WO 01/43126 A2 | 12/2000 |

OTHER PUBLICATIONS

Brown, et al.; "Anamorphic Lenses For Laser Diode Circularization", in Laser Diodes and LED s In Industrial, Measurement, Imaging and Sensors Applications II: Testing, Packaging and Reliabilioty of Semiconductor Lasers V, Preceedings of SPIE, vol. 3945 (2000).

*Primary Examiner*—Paul W. Huber
(74) *Attorney, Agent, or Firm*—MacPherson Kwok Chen & Heid LLP; Jon W. Hallman

(57) ABSTRACT

An optical head of a type useable in a optical disk reader/writer is provided. The optical head has a low profile, e.g., in a vertical direction parallel to the disk spin axis, such as less than about 5 mm preferably less than about 3 mm. Substantially all components of the optical system, including a laser source, objective lens, intervening optics and photo detector are provided in the optical head and mounted in a fixed position with respect to one another. Substantially all optical components of the optical head are moved as a unit, e.g., during tracking and/or focusing. Preferably, the optical head is fabricated using wafer scale and/or stacking technologies, e.g., stacking substantially planar components to achieve the final optical head configuration.

32 Claims, 12 Drawing Sheets

U.S. PATENT DOCUMENTS

| | | | |
|---|---|---|---|
| 5,077,726 A | 12/1991 | Dodds et al. | 369/291 |
| 5,103,476 A | 4/1992 | Waite et al. | 380/4 |
| 5,128,099 A | 7/1992 | Strand et al. | 420/579 |
| 5,146,552 A | 9/1992 | Cassorla et al. | 395/145 |
| 5,247,575 A | 9/1993 | Sprague et al. | 380/9 |
| 5,271,978 A | 12/1993 | Vazan et al. | 428/64 |
| 5,272,693 A | 12/1993 | Fujisawa | 369/291 |
| 5,280,467 A | 1/1994 | Wanger et al. | 369/275.5 |
| 5,286,338 A | 2/1994 | Feldblum et al. | 156/643 |
| 5,323,380 A | 6/1994 | Oda et al. | 369/275.1 |
| 5,331,627 A | 7/1994 | Childers et al. | 369/291 |
| 5,339,091 A | 8/1994 | Yamazaki et al. | 345/104 |
| 5,379,266 A | 1/1995 | Russell | 365/234 |
| 5,388,113 A * | 2/1995 | Oka | 372/21 |
| 5,436,871 A | 7/1995 | Russell | 365/234 |
| 5,447,768 A | 9/1995 | Takahashi | 428/66.6 |
| 5,465,238 A | 11/1995 | Russell | 365/234 |
| 5,475,399 A | 12/1995 | Borsuk | 345/130 |
| 5,511,035 A | 4/1996 | Russell | 365/234 |
| 5,511,058 A | 4/1996 | Visel et al. | 369/103 |
| 5,532,920 A | 7/1996 | Hartrick et al. | 364/419.1 |
| 5,534,385 A | 7/1996 | Spahn | 430/270.13 |
| 5,541,888 A | 7/1996 | Russell | 365/234 |
| 5,555,304 A | 9/1996 | Hasebe et al. | 380/4 |
| 5,563,947 A | 10/1996 | Kikinis | 380/4 |
| 5,581,540 A | 12/1996 | Dang | 369/291 |
| 5,587,994 A | 12/1996 | Nagaura et al. | 369/291 |
| 5,591,501 A | 1/1997 | Ovshinsky et al. | 428/64.1 |
| 5,610,902 A | 3/1997 | Childers et al. | 369/289 |
| 5,619,488 A | 4/1997 | Ota et al. | 369/112 |
| 5,629,980 A | 5/1997 | Stefik et al. | 380/4 |
| 5,638,241 A | 6/1997 | Sonderegger | 360/133 |
| 5,654,856 A | 8/1997 | Akiyama et al. | 360/133 |
| 5,696,714 A | 12/1997 | Russell | 365/106 |
| 5,703,951 A | 12/1997 | Dolphin | 380/25 |
| 5,719,850 A | 2/1998 | Yoshioka et al. | 369/283 |
| 5,719,972 A | 2/1998 | Caron et al. | 385/18 |
| 5,726,971 A | 3/1998 | Wanger et al. | 369/291 |
| 5,732,058 A | 3/1998 | Iwamura et al. | 369/75.2 |
| 5,737,300 A | 4/1998 | Ota et al. | 369/112 |
| 5,748,609 A | 5/1998 | Tanaka | 369/291 |
| 5,757,584 A | 5/1998 | Schick | 360/99.08 |
| 5,757,741 A * | 5/1998 | Jiang et al. | 369/44.12 |
| 5,757,908 A | 5/1998 | Cooper et al. | 380/4 |
| 5,764,603 A | 6/1998 | Glaser-Inbari | 369/44.23 |
| 5,765,152 A | 6/1998 | Erickson | 707/9 |
| 5,768,241 A | 6/1998 | Kanazawa et al. | 369/77.2 |
| 5,793,584 A | 8/1998 | Knight et al. | 360/133 |
| 5,793,742 A | 8/1998 | Sandell et al. | 369/291 |
| 5,796,697 A | 8/1998 | Masaki et al. | 369/75.2 |
| 5,799,157 A | 8/1998 | Escallon | 395/227 |
| 5,808,986 A | 9/1998 | Jewell et al. | 369/44.37 |
| 5,812,519 A | 9/1998 | Kawamura et al. | 369/275.1 |
| 5,828,482 A | 10/1998 | Jain | 359/211 |
| 5,831,967 A | 11/1998 | Otsuka et al. | 369/291 |
| 5,831,968 A | 11/1998 | Tanaka | 369/291 |
| 5,838,653 A | 11/1998 | Fan et al. | 369/275.1 |
| 5,850,384 A | 12/1998 | Ohmori et al. | 369/291 |
| 5,857,021 A | 1/1999 | Kataoka et al. | 380/4 |
| 5,859,829 A | 1/1999 | Otsuka et al. | 369/77.2 |
| 5,859,831 A | 1/1999 | Naito et al. | 369/291 |
| 5,870,364 A | 2/1999 | Raczynski | 369/47 |
| 5,876,823 A | 3/1999 | Nagashima | 428/64.1 |
| 5,881,038 A | 3/1999 | Oshima et al. | 369/59 |
| 5,886,979 A | 3/1999 | Moribe et al. | 369/275.3 |
| 5,892,825 A | 4/1999 | Mages et al. | 380/3 |
| 5,897,324 A | 4/1999 | Tan | 434/317 |
| 5,912,786 A | 6/1999 | Nicklos et al. | 360/99.09 |
| 5,930,074 A | 7/1999 | Nicklos | 360/99.06 |
| 5,930,215 A | 7/1999 | Fite et al. | 369/58 |
| 5,946,282 A | 8/1999 | Hirono et al. | 369/112 |
| 5,949,601 A | 9/1999 | Braithwaite et al. | 360/60 |
| 5,963,532 A | 10/1999 | Hajjar | 369/112 |
| 6,005,835 A * | 12/1999 | Tsuji et al. | 369/112.15 |
| 6,097,689 A * | 8/2000 | Choi | 369/112.19 |
| 6,128,134 A | 10/2000 | Feldman et al. | 359/565 |
| 6,134,195 A * | 10/2000 | Kawamura | 369/44.23 |
| 6,134,208 A * | 10/2000 | Taniguchi et al. | 369/112.19 |
| 6,278,681 B1 * | 8/2001 | Nagano | 369/112.16 |
| 6,556,533 B1 * | 4/2003 | Fukakusa et al. | 369/112.19 |

\* cited by examiner

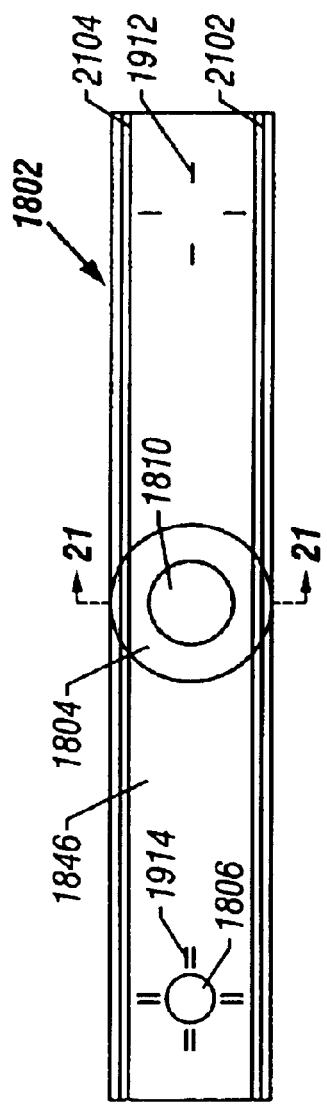
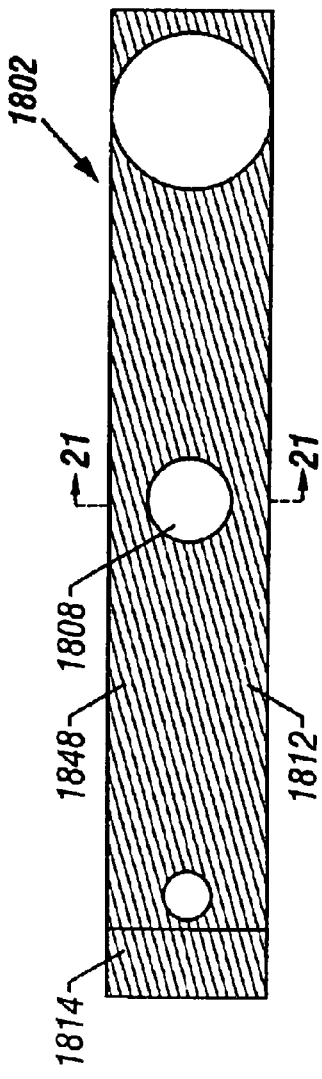
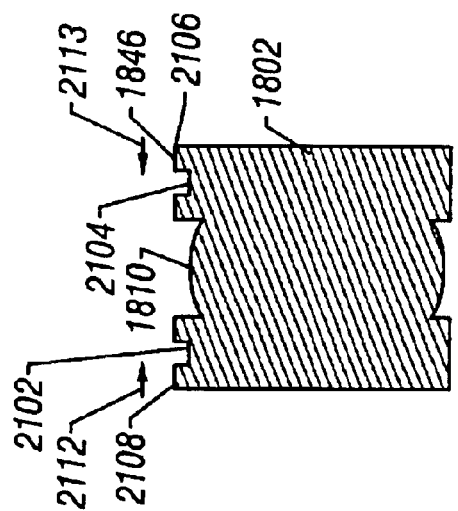

LOW PROFILE OPTICAL HEAD

The present application is a continuation-in-part of patent application Ser. No. 09/457,104 filed Dec. 7, 1999, incorporated herein by reference. Cross reference is made to U.S. patent application Ser. No. 09/315,398 entitled Removable Optical Storage Device and System, filed May 20, 1999, and to U.S. Patent Application No. 60/140,633 entitled Combination Mastered and Writeable Medium and Use in Electronic Book Internet Appliance, filed Jun. 23, 1999.

The present invention is related to an optical head, e.g., for use in reading from and writing to an optical disk and in particular to an optical head where substantially all optical components from the laser source to the objective are maintained in a fixed spatial relationship.

BACKGROUND INFORMATION

One of the important factors affecting design of an optical system (such as a system for an optical disk reader/writer, typically including a laser or other optical source, lenses, reflectors and other components) is the size of the optical system, both in terms of the mass, volume and/or dimensions and in terms of the size and shape of the light as it reaches the optical disk (the spot size and quality). Although a wide variety of systems have been used or proposed, typical previous systems have used optical components that were sufficiently large and/or massive that functions such as focus and/or tracking were performed by moving only some components of the system, such as moving the objective lens (e.g. for focus) relative to the laser or other light source. Without wishing to be bound by any theory, it is believed that the relatively large size of components was related to the spot size, which in turn was substantially dictated by designs in which the data layer of a disk was significantly spaced from the physical surface of the disk (so that the optical path typically passed through a disk substrate, or some other portion of the disk, typically passing through a substantial distance of the disk thickness, such as about 0.6 mm or more, before reaching the data layer).

Regardless of the cause behind providing for relative movement between optical components, such an approach, while perhaps useful for accommodating relatively larger or massive components, presents certain disadvantages, including the relatively large form factors required and the cost associated with establishing and maintaining optical alignment between components which must be made moveable with respect to one another. Such alignment often involves manual and/or individual alignment or adjustment procedures which can undesirably increase manufacturing or fabrication costs for a reader/writer, as well as contributing to costs of design, maintenance, repair and the like. Accordingly, it would be useful to provide an optical head method, system and apparatus which can reduce or eliminate the need for relative movement between optical components, during normal operation and/or can reduce or eliminate at least some alignment procedures, e.g., during reader/writer manufacturing.

Many early optical disks and other optical storage systems provided relatively large-format reader/writer devices including, for example, devices for use in connection with 12 inch (or larger) diameter disks. As optical storage technologies have developed, however, there has been an increasing attention to providing feasible and practical systems which are of relatively smaller size. For some applications, e.g., for use in personal electronic devices (PEDs), e.g. as described in U.S. patent application Ser. No. 09/315,398 for Removable Optical Storage Device and System (incorporated herein by reference), a device for reading and/or writing optical disks is described having a relatively small form factor such as about 10.5 mm height, 50 mm width and 40 mm depth. Generally, a practical reader/writer device must accommodate numerous items within its form factor including the media, media cartridge (if any), media spin motor, power supply and/or conditioning, signal processing, focus, tracking or other servo electronics, in addition to the components associated or affecting the laser or light beam optics. Accordingly, in order to facilitate a relatively small form-factor, it would be advantageous to provide an optical head apparatus, system and method which can occupy a relatively small volume. In addition to total volume considerations, constraints imposed by a desired form factor and/or the need to accommodate other reader/writer components can make it advantageous to provide an optical head apparatus system and method which is relatively small in certain dimensions such as having a relatively small vertical profile or dimensional requirement (with "vertical" referring to a direction parallel to the optical disk spin axis), although reduction of requirements in other dimensions (such as a longitudinal dimension parallel to an optical arm axis and/or a lateral dimension perpendicular to the longitudinal axis) may also be of importance. Provision of a low vertical profile configuration can be specially problematic since, for at least some optical designs (including, e.g. finite conjugate designs), a minimum optical path may be required or advisable (although the read/write beam generally must reach the optical disk substantially normal to the plane of the disk). Accordingly, it would be useful to provide an optical head apparatus system and method which can reduce dimensional requirements such as reducing vertical dimension requirements, e.g., in the case of a PED to less than about 12 mm, preferably less than about 5 mm and more preferably less than about 3 mm.

A number of optical reader/writer devices, including, for example, relatively large devices such as audio compact disk (CD) players in a typical home stereo system, present relatively little concern with power management or power budgets (typically having access to AC line level power or the like). As a result, in many such systems, it is feasible to provide an optical design which is relatively inefficient of optical power (such as by substantially overfilling lenses and the like, e.g. to accommodate noncircularity of laser sources). In contrast, devices such as those-described in this application Ser. Nos. 09/315,398, supra and or 60/140,633 intended to be lightweight and portable, generally must operate with a limited power budget (and also have a more limited ability to dissipate heat, compared with larger systems). Accordingly, it would be useful to provide a optical head apparatus system and method which can achieve the desired optical quality (e.g. accommodating noncircularity or other optical features) while avoiding undue energy inefficiency and/or unnecessary heat generation (e.g. arising from substantial overfilling of lenses or other optical inefficiencies which in turn require higher optical power and hence higher electrical power lasers which dissipate more heat).

SUMMARY OF THE INVENTION

The present invention provides a practical and feasible system in which substantially all components of the optical head from the laser or other light source to the objective move together as a unit (e.g. for focus and/or tracking), i.e. in which substantially each optical component of the optical head is in a fixed location with respect to other components.

In one embodiment, the optical head is based on a wafer-scale fabrication approach. Preferably, a silicon or similar wafer having electronics formed therein, in the normal fashion, has optical components stacked or otherwise positioned thereon, preferably at least some components being placed prior to slicing the wafer, to form the optical components of the optical head. In one embodiment, a first mirror/spacer level is positioned on the wafer and one or more levels of optics (generally proportioned similar to the proportions of the "chip" after wafer slicing) are positioned on the top of the spacers. In one embodiment, alignment of some or all optical layers above the spacer is performed while the laser source (preferably mounted on the wafer) is emitting laser light, and using the emitted laser light to assist in positioning or alignment.

In one embodiment, the read/write beam travels through one of the optics layers in a direction substantially parallel to the plane of the disk. Providing a configuration in which a substantial portion of the optical path is parallel to the plane of the disk assists in providing a relatively low vertical profile. By providing a system which can use wafer-scale fabrication and which can be fabricated by stacking discrete components such as spacers, optical components and the like, it is possible to construct a small, high precision, low weight, low profile and/or small spot-size optical head at relatively low fabrication costs. As used herein, "read/write" refers to configurations that are used for only for reading and to configurations that are used for both reading and writing.

In one aspect an optical head of a type useable in a optical disk reader/writer is provided. The optical head has a low profile, e.g., in a vertical direction parallel to the disk spin axis, such as less than about 5 mm preferably less than about 3 mm. Substantially all components of the optical system, including a laser source, objective lens, intervening optics and photo detector are provided in the optical head and mounted in a fixed position with respect to one another. Substantially all optical components of the optical head are moved as a unit, e.g., during tracking and/or focusing. Preferably, the optical head is fabricated using wafer scale and/or stacking technologies, e.g., stacking substantially planar components to achieve the final optical head configuration.

BRIEF DESCRIPTION OF THE DRAWINGS

FIG. 19 is a top plan view of an Optical Element Unit (OEU) according to an embodiment of the present invention;

FIG. 20 is a bottom plan view of an Optical element unit according to an embodiment of the present invention;

FIG. 21 is a transverse cross-sectional plan view of an Optical element unit (OEU) according to an embodiment of the present invention;

DETAILED DESCRIPTION OF THE PREFERRED EMBODIMENT

Figure 1:
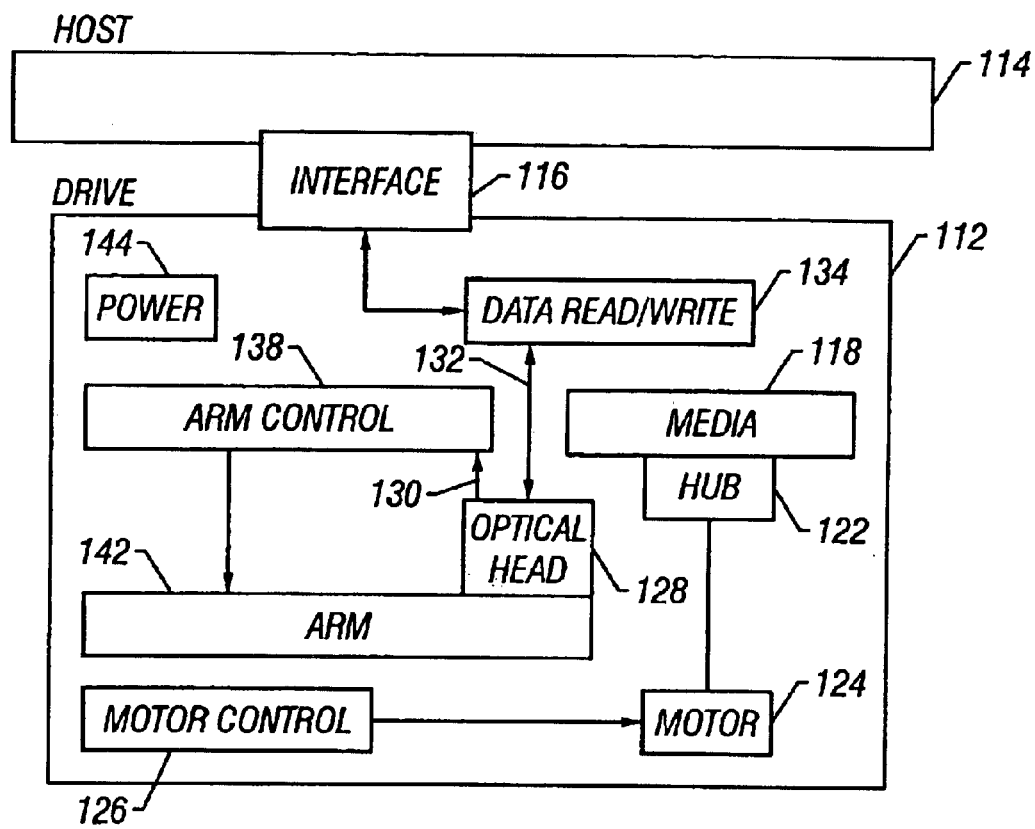
FIG. 1 is a simplified block diagram of a reader/writer drive device coupled to a host device of a type that can be used in connection with embodiments of the present invention.

The present invention can be used in the context of a number of drives and drive configurations, including as described in U.S. patent application Ser. No. 09/315,398, supra. In the configuration depicted in FIG. 1 a reader/writer drive device 112 is coupled to a host device 114 (which may be, for example, a personal electronic device (PED) such as a music and/or video player, a camera, and electronic book or other text reader and the like) by an interface 116. In the embodiment depicted in FIG. 1, the drive 112 holds or receives optical media, typically an optical disk 118 which has a hub 122 for coupling or centering with respect to a disk spin motor 124 under control of a motor control 126. In one embodiment, the media 118 is a first surface media, e.g. as described in U.S. patent application Ser. No. 09/315,398 supra., incorporated herein by reference. Bits on the media 118 are read or written using an optical head 128 (e.g. as described more thoroughly below) which provides data or signals 132 to a data read/write electronics 134, e.g., for passing to the host 114 via the interface 116. The optical head 128, in one embodiment, includes substantially all components or devices which control or affect the laser or optical beam along its entire path from generation to arrival and/or reflection from the media 118 and detection, including the laser or other light source, lenses, gratings, holograms, wave plates, mirrors, beam splitters and other refractive, reflective, diffractive or other optics for affecting the light beam or controlling, photo diode or other light detectors and the like. Preferably, some or all electronics for controlling and/or modulating the laser and/or conditioning, digitizing and/or processing detection signals are included in the optical head. Information or signals obtained using the optical head 128 are also provided 136 to an arm control electronics 138 which moves or controls an optical arm 142, e.g. for tracking and/or focus. A power source or conditioner 144 provides power for electronics and/or motors or actuators. Various configurations of a drive 112 can have other components, not depicted in FIG. 1, such as mechanical components for receiving and/or ejecting the media 118 and/or media cartridges, content control electronics, microprocessors or other processors, data storage memory devices, data encryption/decryption electronics, and/or other components as will be understood by those of skill in the art after understanding the present disclosure.

The size, mass, volume, shape and/or vertical, longitudinal and/or lateral dimensions or requirements and/or cost of the optical head 128 are of significance to the overall feasibility and cost of a drive device 112, especially when the configuration of the drive device 112 places constraints on the position, size, shape or cost of other components of the drive 112, and particularly when it is desired to substantially accommodate the drive 112 in a certain form factor, e.g., as described in U.S. patent application Ser. No. 09/315, 398, supra.

Figure 2:
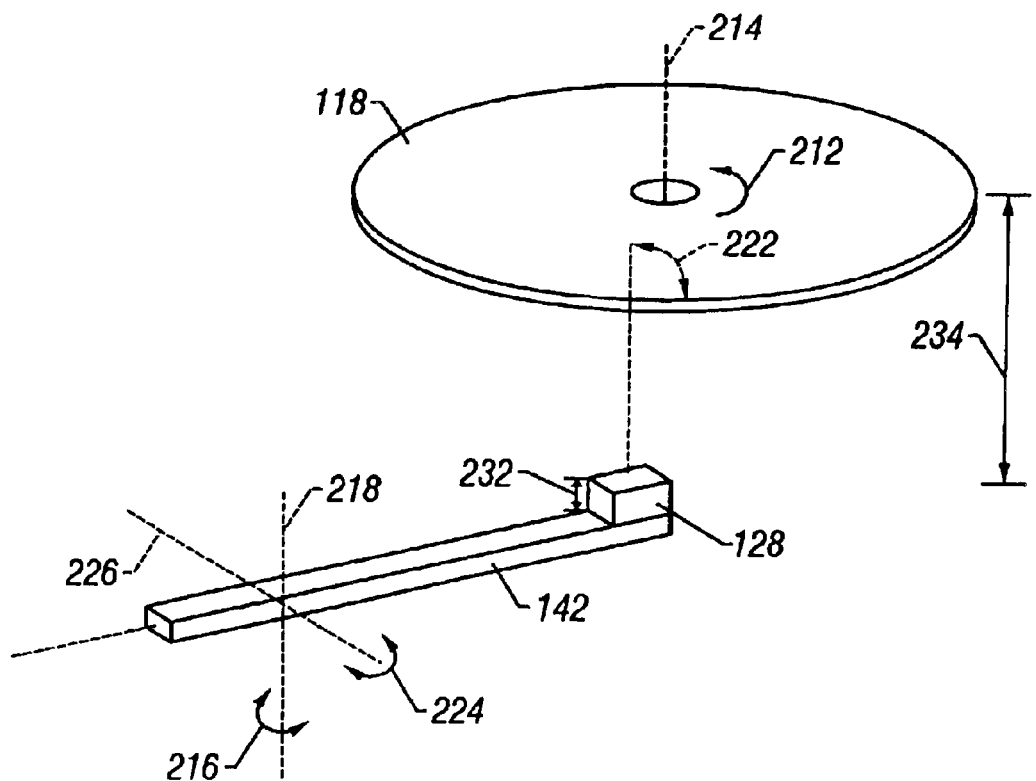
FIG. 2 is a perspective schematic view of an optical arm and optical disk according to an embodiment of the present invention.

FIG. 2 illustrates in generalized or schematic form, a positional relationship of an optical head 128 and arm 142 with respect to media 118 according to one embodiment of the present invention. In the embodiment of FIG. 2, the optical head 128 is mounted in a fixed position with respect to the optical arm 142. As described more thoroughly below, preferably, all components of the optical head 128 are in a constant or fixed position with respect to one another, i.e. there is substantially no relative movement of any optical component of the optical head 128 with respect to any other component of the optical head. Instead, in the depicted embodiment, to achieve desired alignment with data on the media 118 (i.e. tracking) and/or focus, the entire optical head 128 is moved, as a unit, with respect to the media 118.

In a preferred embodiment, the optical path is configured such that the optical path length (measured along the optical axis, following any folding of the optical path) from the source to the objective is substantially greater than the distance from the objective to the data surface of the medium. In one embodiment, the ratio of the source-to-objective path length to the objective-to-data surface path length is at least about 5. As used herein "objective" or "objective lens" refers to the component which focuses light onto the recording layer or recording surface of the medium. Although this is typically a conventional refractive lens, it can also include reflective, diffractive, or holographic components. Although typically the last or ultimate optical component along the optical path before the light reaches the medium, "objective" or "objective lens" as used herein can also encompass items which may not be the last optical component before reaching the medium. The optical path length from the objective to the data surface is a function of a number of factors including the numerical aperture of the lens, the distance (if any) from the disk surface to the data surface and the smallest safe spacing between the optical head and the disk surface (the "working distance"). In one embodiment, it is desired to provide an optical path length from the source to the objective greater than about 2.5 mm, preferably greater than about 4 mm, and even more preferably greater than about 4.5 mm. One embodiment of the present invention involves achieving such a source-to-objective path length while providing a low-profile device, preferably such that a reader/writer device can be accommodated in a form factor with a (vertical) profile less than about 10.5 mm, preferably less than or equal to about 6 mm.

In the depicted embodiment, media 118 rotates 212 about a spin axis 214 which defines what will be referred to herein as the vertical direction. Spinning of the disk 212 provides for alignment of the light beam with (successive) circumferential positions on the disk 118. Alignment with desired radial positions (tracking) is provided by moving the optical head 128 in a direction having a radial component, preferably by rotating 216 the optical arm 142 about a substantially vertical axis 218 so that the position at which the light beam reaches the disk 118 defines an arc 222 extending throughout a predetermined radial range of the disk 118. In the depicted embodiment, to provide focusing, the entire optical head 128 is moved, as a unit, along a path having a vertical component such as by pivoting 224 the arm 142 about a substantially horizontal axis 226. Although the illustration of FIG. 2 is not to scale, it suffices to illustrate that the overall vertical dimension for accommodating the component depicted in FIG. 2 will be affected by the vertical profile or height 232 of the optical head 128, as well as other dimensions such as the spacing 234 to the media 118 and the like.

Figure 11:
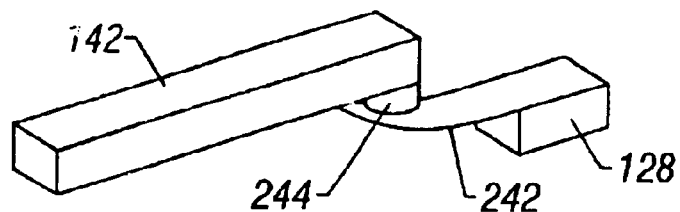
FIG. 11 is a partial perspective view depicting an optical arm and a relatively movable optics head, according to an embodiment of the present invention.

FIG. 2 depicts an embodiment in which not only the optics components of the optics head 128 move together, but in which the optics head moves with (is substantially rigidly coupled to) the optics arm 142. It is also possible to provide embodiments in which, while components of the optics head (preferably including at least the light source and the objective) are non-movable with respect to each other, the optics head may be movable with respect to some or all of the arm. For example, in the embodiment of FIG. 11, the optics head 128 may be coupled to the arm 142 by a movable or flexible, preferably resilient, leaf member 242. The leaf member 242 may include all or part of a flexible printed circuit (flex-circuit) device e.g. for providing signals to and from the optics head 128. A number of flex circuit materials or devices can be used. One example is a flex circuit using a substrate including a polyimide material such as that sold under the trade name Kapton®, available from E. I. du Pont de Nemours and Company of Wilmington, Del., with one or more copper traces or regions and/or one or more electronic components formed or mounted thereon). Preferably, movement of the head 128 with respect to the arm 142 can be positively controlled, such as by using a voice coil 244 or other electromagnetic or electronic device for moving the head toward or away from the arm 142.

Figure 3:
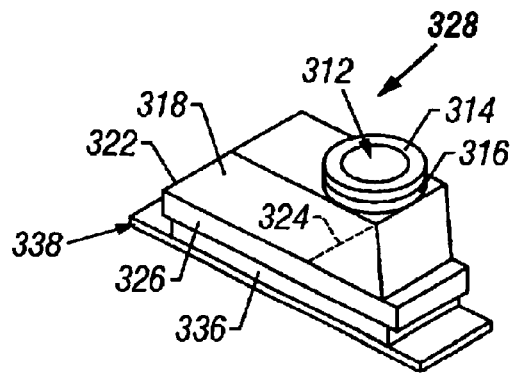
FIG. 3 is a perspective view of an optical head according to an embodiment of the present invention.
Figure 4:
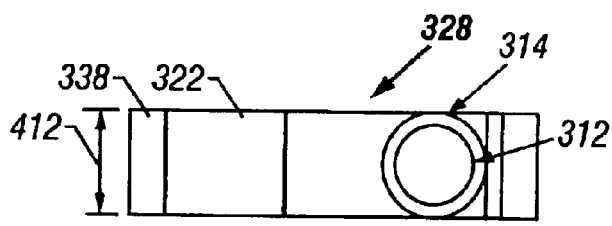
FIG. 4 is a top plan view of the optical head of FIG. 3.
Figure 5:
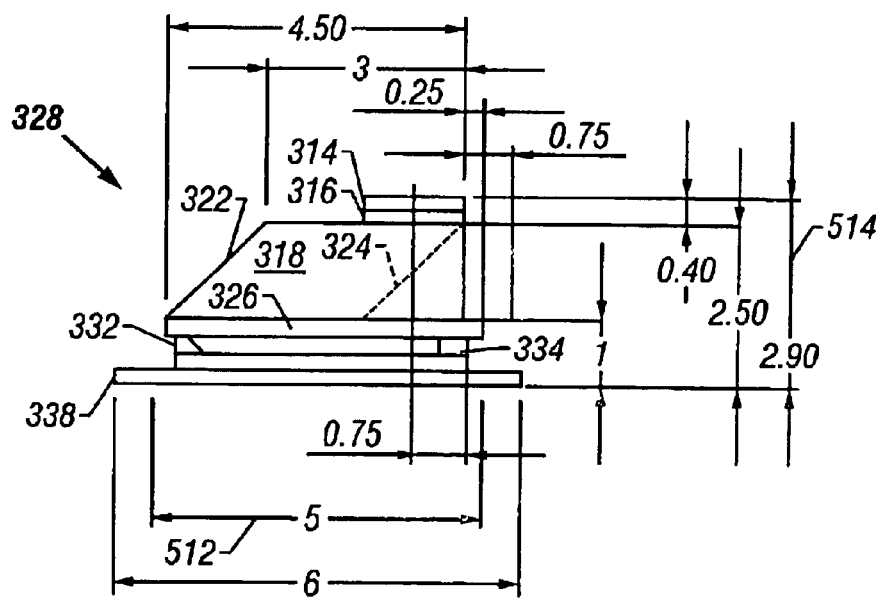
FIG. 5 is a side elevational view of an optical head of FIG. 3.

FIGS. 3–5 depict an optical head 328 according to one embodiment of the present invention. In the depicted embodiment, an objective lens 312 is positioned by a lens mount 314 over a quarter wave plate 316. In some embodiments, some or all functions of the quarterwave plate can be provided by a coating, rather than a plate. The lens mount can be formed of a number of materials including steel, glass, or silicon. The quarter wave plate can be formed of a number of materials, including mica and quartz. In some embodiments the functionality of a quarter wave plate can be provided by a coating. Below the quarter wave plate 316 is a optical block, referred to herein as a periscope 318. The periscope 318 is substantially transparent, at least at the wavelength of the laser light, and defines a first angled (preferably 45° angle with respect to vertical) surface 322 acting substantially as a mirror, as described more thoroughly below. Preferably the 45° surface 322 will be coated with a substantially reflective coating such as aluminum or reflective chrome coatings. The periscope 318, in the depicted embodiment, also includes a interior polarization beam splitter surface 324 also preferably at about 45° (with respect to vertical) which is substantially reflective (i.e. acts substantially as a mirror) for light with a first polarization and substantially transmissive for light with a second polarization. The periscope block can be made from a number of material, including, e.g., fused silica or SF2 (flint glass).

Below the periscope 318 is an optical die or "optical element unit" (OEU) 326. Use of the term "die" represents a convenience, and should not be taken as limiting the invention to only the depicted parallelepiped, parallelogram or other shapes depicted herein. The OEU 326 is provided with lenses, gratings, holograms, and/or other optical components or devices, as described more thoroughly below.

The OEU 326 is coupled by spacer blocks 332, 334 to an underlying sub-mount 336 (preferably sliced from a silicon or similar wafer, as described more thoroughly below). In the depicted embodiment, the sub-mount 336 is positioned on a printed circuit board 338 or flex circuit.

The light path has its origin in the laser diode 612 mounted, with respect to the sub-mount 336, e.g., using a laser mount 614. In one embodiment, the laser beam is not collimated but follows a diverging configuration substantially from the laser source to the objective lens which forms a finite conjugate imaging system. In this configuration the beam-forming optics are provided principally for fully or partially circularizing the light and/or fully or partially correcting astigmatism and/or providing a beam pointing adjustment function. One potential advantage of a finite conjugate (point-to-point imaging system) is that the substantial demagnification provides an effective reduction or elimination of the astigmatism that arises from the laser. However, circularizing lens 352a may create sufficient astigmatism that a second lens or other optics 352b may be advisable for correcting astigmatism. It is also possible to position lenses or other optics on the surface of the sub-mount 336 between the laser and the mirror block 332, e.g. for circularizing or other optics purposes. In one embodiment lenses or similar optics 352a, b along the optical path are configured to at least partially correct for angular errors in the mounting (and thus the beam direction) of the laser diode.

In the depicted embodiment, the laser diode is a side-emitting laser diode and the horizontal laser beam 616 output by the laser diode 612 is reflected to a vertical beam by a 45° surface 618 positioned with respect to the sub-mount 338 preferably by being incorporated as a surfaces of one of the spacers 332. In one embodiment, a portion of the emitted laser beam is reflected back (e.g. from the OEU 326) for purposes of monitoring and controlling laser power output. In one embodiment, the laser is a red-light laser. Preferably, however, the present invention can accommodate the use of shorter-wavelength lasers, such as blue-light lasers, (e.g. for achieving decreased spot size and increased data density) while still retaining the same general configuration of the optical head as used with red-light lasers (such as configurations having substantially all optical components moving together, mounted at one end of the optical arm, formed of one or more optical-element plates, each with multiple optical elements, and/or defining an optical path with the majority of the length through a glass or other solid substance), although some details (such as shape or power of lenses or other optics, pupil size, etc.) may be changed to accommodate short-wavelength light.

Figure 16:
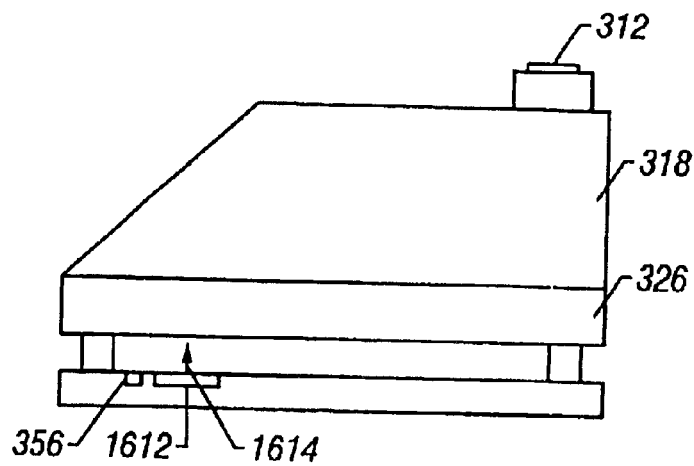
FIG. 16 is a side elevational view of components of an optical head which uses a VCSEL, according to an embodiment of the present invention.

As depicted in FIG. 16, the use of surface 618 for turning the beam from a horizontal beam 616 to a vertical beam could be eliminated from the design by providing a laser which is not side-emitting, such as a vertical cavity, surface-emitting laser (VCSEL) 1612 (e.g. as described in U.S. patent application Ser. No. 09/315,398, supra) which can be configured or positioned to emit substantially in a vertical direction 1614. VCSEL's are also useful because of the substantial circularity of the beam and reduction or elimination of astigmatism.

Figure 8:
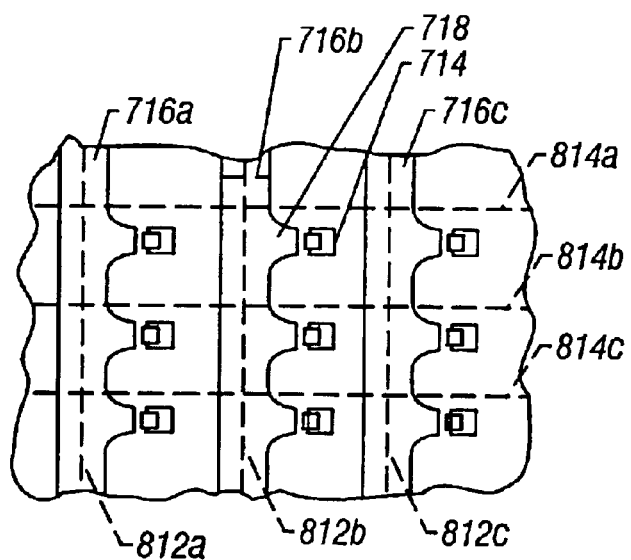
FIG. 8 is a top plan view of a portion of a wafer with mounted spacer components.
Figure 7:
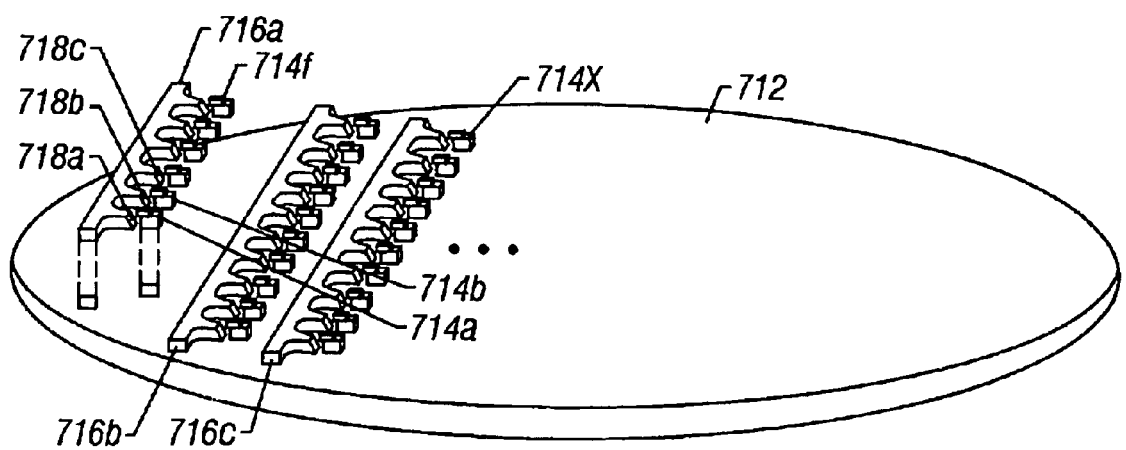
FIG. 7 is a perspective view partially exploded of a wafer and partially mounted spacer components according to an embodiment of the present invention.
Figure 9:
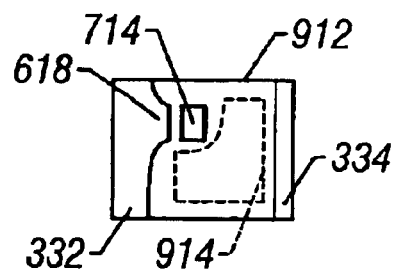
FIG. 9 is a top plan view of one resultant wafer section following wafer cutting.

As depicted in FIG. 7, in one embodiment the sub-mount 336 is formed from a small ("sliced") portion of a larger silicon (or other) wafer 712 (FIG. 7), with the wafer being formed, using typical wafer fabrication techniques, preferably including a plurality of other electronic components forming portions of some or all of the drive circuitry 112 such as a high frequency laser modulator, pre-amp, laser diode driver, photodetector and associated circuitry, power or control circuitry, tracking or focus servo, data read/write electronics and the like. A wafer 712 formed with a plurality of silicon "chip" regions (which will be separated, e.g., by sawing or slicing, as described below) then has mounted on it, e.g. using optically guided pick and place technologies or the like, a plurality of laser diodes and mounts 714a through 714x and a plurality of spacer bars with integrated mirrors 716a,b,c. Each spacer bar 716 contain a plurality of 45° mirror surfaces (718a, 718b, 718c, etc.). The laser diode 714 and mirror 718 of the spacer bar 716 are positioned on the wafer 712 with respect to the electronics thereon so as to provide for coupling of the laser to laser power, control or similar circuitry and to provide for substantial alignment of the output beam of the laser with a corresponding mirror 718. After the desired components are positioned on the wafer 712, the wafer is sliced or sawed, e.g., along a plurality of lines (depicted, in FIG. 8, in phantom, 812a,b,c, 814a,b,c). As shown in FIG. 8, preferably, the saw lines 812abc are positioned so that each resultant chip has left and right spacers 332, 334, resulting from right and left (respectively) portions of sawed spacer bars 716. In the resultant configuration depicted in FIG. 9, each chip 912 has mounted, thereon, in a desired configuration, or alignment, a laser diode 714, a turning mirror 618 and spacers 332 334, preferably with sufficient area 914 on the chip 912 remaining to accommodate various electronic components formed as part of the wafer 712.

Although a number of shapes and sizes of devices can be used according to the present invention, in one embodiment, the sub-mount 336 has a length 512 of about 5 mm and a lateral dimension 412 of about 1.5 mm.

The optical die or optical element ("OE") block 326 which is to be positioned above the sub-mount 336 (and spaced therefrom by the spacers 332, 334) can have a number of different configurations, depending on the desired functions. In the embodiment depicted in FIG. 3, the OEU 326 includes a plurality of beam shaping optics 352 and servo optics 354. In one embodiment, the beam shaping optics 352*a, b* are provided as (or perform functions substantially similar to those of) toric or cylindrical lenses, e.g., for fully or partially circularizing the laser beam, correcting astigmatism and the like. Preferably, the optics are configured to control the overfilling of the objective as desired, e.g. to balance crosstalk with optical efficiency.

The optics 352*a,b*, 354 can be lenses or similar refractive optics, gratings or holograms or other diffractive optics and the like. In some embodiments, optics may be formed in the optical die by etching techniques including providing approximate stepped shapes, continuous shapes, segmented or "telescoped" lenses, Fresnel lenses, and the like. In general, refractive optics are preferred, when otherwise feasible, because of the relatively higher sensitivity of diffractive optics to wavelength.

Figure 18:
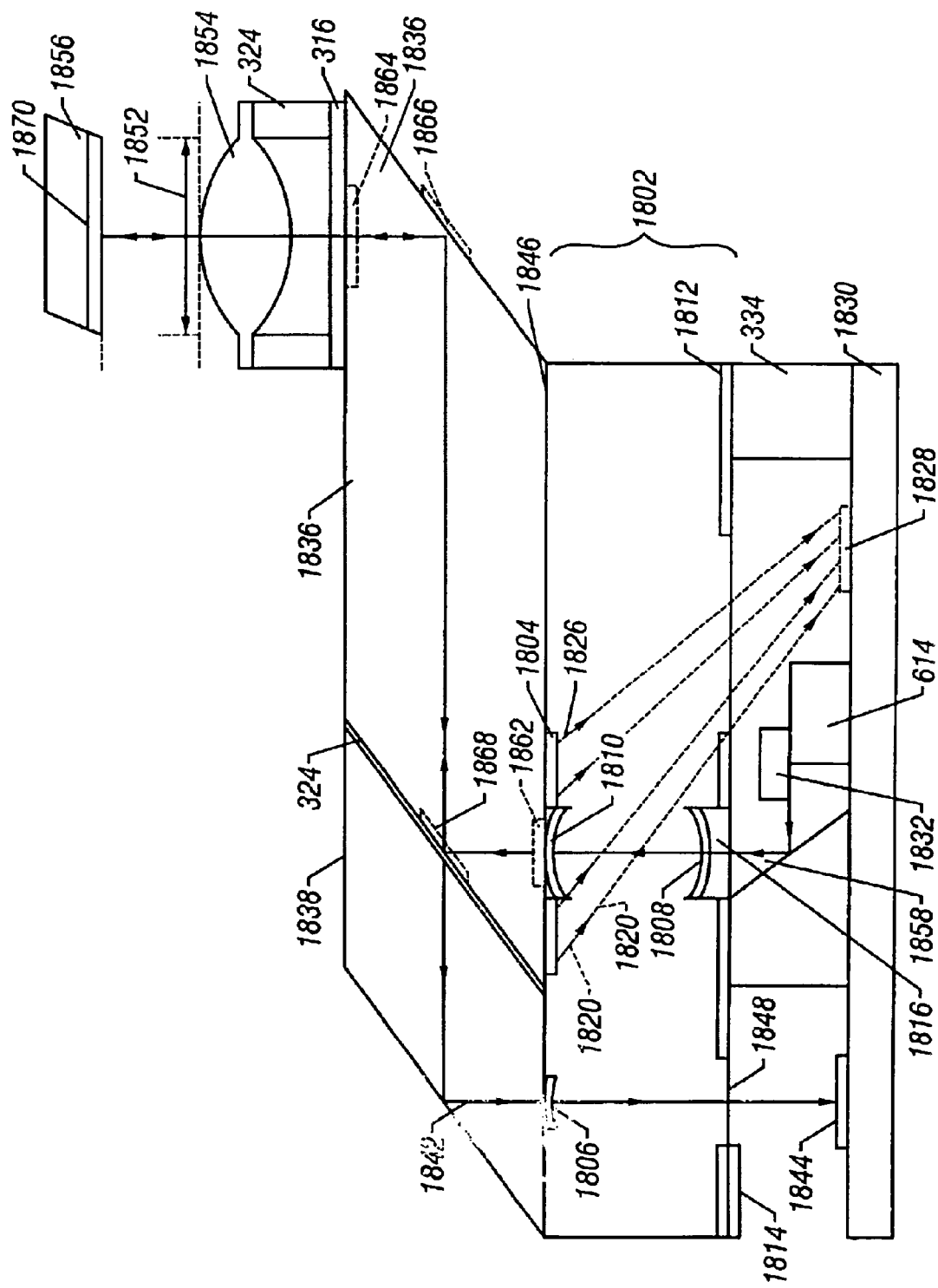
FIG. 18 is a longitudinal cross sectional view of an optical head according to an embodiment of the present invention.

The OEU is preferably a substantially planar (rectangular parallelepiped) block located between the substrate or sub-mount and the periscope. The OEU is provided with a plurality of optical elements or components, whose configuration, fabrication, function and position may be different in different embodiments. FIG. 18 illustrates an embodiment in which the OEU 1802 includes a forward sense optic 1804, a servo optical element 1806, beam-shaping optics 1808, 1810, patterned absorptive coatings 1812, pattern reflective coatings 1814, anti-reflective coatings 1816 and alignment marks 1912, 1914 (FIG. 19).

As depicted in FIG. 18, the forward sense optics 1804 can be used for deflecting some of the outgoing laser light back 1820, 1826 towards a detector 1828, e.g. mounted on the silicon or substrate 1830. The function of the detector 1828 is to provide an indication of outgoing laser power, e.g. for use in a control or servo-circuit to maintain desired read and write power levels of the laser 1832. Those of skill in the art will understand how to use signals from the detector 1828 for controlling power at the laser 1832. The forward sense elements 1804 can be, e.g. a reflective hologram (e.g. an etched surface-relief hologram shown, in FIG. 18, on the top surface of the OEU 1802), with or without a further reflective coating such as chrome or aluminum. It would be possible to position the reflective optics or forward sense optics 1804 in other locations such as on a bottom or other surface of the periscope 1836 or the bottom surface 1848 of the OEU. It is also possible to provide forward sense optics 1804 as a transmissive hologram or grating which deflects light to a detector mounted at a location other than the substrate 1830, such as being mounted on the top surface 1838 of the periscope 1836. It is also possible to provide forward sense optics 1804 in the form of a prism, such as an etched prism, or a mirror surface, to direct light towards a detector 1828 mounted on the substrate 1830 or elsewhere.

In the embodiment of FIG. 18, the OEU 1802 also includes a servo-optic element ("SOE") 1806. The servo-optic element 1806 acts to modify light returning from the disk 1842 and/or direct the returning light to one or more detector arrays 1844 for the purpose of generating useful tracking signals, focus signals and/or data signals (e.g. as described more thoroughly below). The SOE 1806 may be a hologram or may be a formed or etched refractive element. Although FIG. 18 depicts the SOE 1806 on the upper surface 1846 of the OEU 1802, it is also possible to position the SOE on the bottom surface 1848 of the optical block 1802. It is also possible to provide embodiments in which more than one optic element is used for modifying light returning from the disk such as providing for two or more lenses, gratings, holograms and the like. It is also possible to provide embodiments in which one or more SOE elements are positioned other than on the OEU 1802, such as being positioned on a surface of the periscope 1836. The SOE 1806 may be, for example, a cylindrical or toric lense, e.g. of the type commonly used in conjunction with a quadrant detector in the so-called astigmatic focus scheme. Refractive elements can be fabricated by etching, pressing, machining or molding and can be coated or uncoated.

The beam-shaping optics 1808, 1810 may be refractive and/or diffractive components placed in the path of the outgoing beam e.g. to modify the angular divergence of the laser beam, e.g. specifically to achieve a desired beam profile at the pupil 1852 of the objective lens 1854. The relationship between the size and intensity-profile of the laser beam as it reaches the objective lens 1854, with respect to the size and shape of the objective lens 1854 affects the shape of the focused spot at the disk 1856, and hence the ability to resolve data marks, and affects the amount of track-to-track and in-track cross-talk. When the laser source 1832 is a edge emitter laser diode, as depicted, the laser beam, initially, will be generally in the form of an elliptical Gaussian beam. The beam, as it reaches the objective lens 1854 will have one elliptical axis substantially tangential to the disc tracks and the other elliptical axis substantially radial to the disk tracks. The intensity of the laser light at the circumference of the objective lens 1854 in the radial and tangential directions (expressed as a percentage of the central beam intensity) are referred to as the rim intensities in these directions. A particular drive design may place lower or upper limits on rim intensities. In at least some embodiments, and especially in the case of low power drives, e.g. for portable devices, there may be a constraint to provide a relatively high amount of light or percentage of light reaching the disk from the laser. In these cases, lower rim intensities are generally preferred since this is indicative that overfilling the lens is being substantially avoided thus, avoiding the spilling or wasting of light energy. In one embodiment the rim intensity is not greater than about 80% in the tangential direction and/or not greater than about 40% in the radial direction (compared to the central or maximum intensity). In one embodiment the rim intensity is preferably not less than about 50% in the tangential direction and/or not less than about 15% in the radial direction. In the limit of low rim intensities, all of the available light is passed by the lens. Accordingly, in at least one embodiment, the beam shaping optics 1808, 1810 are configured to assist in modifying the beam to achieve the desired intensity (or other) profile at the lens 1854. In at least one embodiment, one or both of the beam-shaping lenses 1808, 1810 are anamorphic, aspheric elements.

Although in the embodiment of FIG. 18, the outgoing beam 1858 passes through two optic elements 1808, 1810 formed on opposite surfaces 1846, 1848 of the OEU 1802, it is possible to provide embodiments in which only one optic element is positioned in the OEU 1802 in the path of the outgoing beam 1858. It is also possible to provide embodiments in which one or more refractive or diffractive elements for affecting the outgoing beam are positioned on the periscope 1836, such as on a lower surface region 1862, an upper surface 1864, (which, in the depicted location, would also be in the path of the returning beam), an angled reflective surface 1866 (also in the return beam path) and interior surface 1868 (also in the return-beam path) and the like. Optical elements in the path of the outgoing bean can also perform useful (or vital) functions other than (or in addition to) controlling the rim intensities. Beam-steering optical elements can be provided to correct laser beam pointing errors (e.g. errors arising from off-axis mounting of the laser diode 1832 and the like). It is also possible to provide at least partial correction of pointing errors by translating or rotating the OEU 1802 in tangential and/or radial directions. This approach is facilitated when the beam shaper optics have optical power in both directions (tangential and radial). In general, the range of beam steering adjustment is at least partially limited by the wave-front error that is induced by the position error (which degrades the spot profile at the disk and the data and servo signals). Another function that can be achieved by diffractive or refractive optics in the outgoing beam path is correction of laser diode astigmatism. Since the surfaces are generally aspheric, some astigmatism may be designed-in to cancel that which is typically inherent in laser sources such as laser diodes.

In some embodiments, portions of surfaces of the OEU 1802 (or other components, such as the periscope 1836) are coated with an absorptive coating 1812 patterned on the top 1846 or bottom surfaces 1848 (or on the side or end surfaces). Absorptive coatings can be used to control the path of unwanted light within the optical head. With the laser and detectors in relatively close proximity, and in close proximity with many surfaces that may have varying reflectivities (including the substrate 1830, surfaces of the OEU 1802, periscope 1836, lens 1854 and lens mount and the like, there is a potential for unwanted light reaching optical detectors 1844, 1828 causing erroneous signals of various types such as a focus or tracking offset). In some embodiments, substantially all surfaces which are not designed to permit passage of desired light are coated with a absorptive (or reflective) coating. In another approach, optical ray-tracing (or empirical observation) can determine likely paths of undesired light and locate optimum placement of areas of black (or low reflectance) material designed to minimize unwanted signals.

A number of materials can be used as an absorptive coating such as a single layer of a highly absorbent material such as germanium or silicon. If desired, such absorptive layers may be provided with an additional coating such as an anti-reflective coating to further improve performance. In some embodiments, the absorptive coating may be a multi-layer absorber/anti-reflector (e.g. chromium/anti-reflector multi-layers).

In some embodiments, some regions of the OEU (or other components) may be provided with patterned reflective coatings 1814. These may be positioned and configured to perform functions similar to those of patterned absorptive coatings described above. Patterned reflective coatings may be used to deflect unwanted light which would otherwise fall on detectors. In addition, reflective coatings may be used to help direct light towards a detector such as in the case of the forward sense optic 1804. Reflective coatings can be made from a number of materials having appropriate reflectance and adhesion, including single-layer or multi-layer coatings of metals or metal alloys such as aluminum, gold, silver, chromium, and the like or from single or multilayer dielectric coatings. Other materials for use as reflective coatings will be understood by those of skill in the art after understanding the present disclosure.

In some embodiments, anti-reflection coatings are provided on selected surfaces or portions thereof, e.g. to reduce reflections which may cause unwanted signals on detectors and/or to reduce the amount of reflective loss of optical power in the system. In general, anti-reflective coatings may be used on surfaces which are not in optical contact with other surfaces of the same refractive index. In such cases, in the absence of anti-reflection coatings, there is always some reflection loss. For example, typically a glass-air interface reflects about 4 percent of the light (at normal incidence). In a case where the OEU 1802 is solder-pad bonded to the periscope 1836, a gap (typically of a few micrometers) is present, which is filled with air, and unwanted reflections can occur unless anti-reflection coatings are applied. In the case where the optic block 1802 is substantially adjacent to the periscope 1836 (e.g. in cemented or adhesive-bonded configurations), some or all of the optics 1804, 1806, 1810 may be formed by an etching or similar process to provide regions which are recessed below the upper surface 1846, thus creating an air gap. A number of materials can be used as anti-reflection coatings. In one embodiment, single or multi-layer thin films, usually of a dielectric material such as magnesium fluoride, applied in predetermined thicknesses, will reduce or substantially eliminate optical reflections over a specific wavelength and angular range. Those of skill in the art will understand how to select and apply anti-reflective coatings after understanding the present disclosure.

In some embodiments, to assist in optically aligning the OEU for assembly to the substrate or periscope, alignment marks 1912, 1914 are provided. In some embodiments the alignment marks 1912, 1914 are sized and shaped to overlap or compliment corresponding marks on other components, such as the substrate 1830 or periscope 1836, to facilitate precise location, such as location to a precision of about 10 micrometers or less. A number of materials and procedures can be used for forming alignment marks. In one embodiment, the alignment marks are photolithographically-defined lines or targets which may be formed during any of the other photolithographic steps in the fabrication of the OEU and/or etched or coated along with other components such as the forward sense element or the servo-optical element. The marks may be on the top surface (FIG. 19) or bottom surface.

In some embodiments, substantially all of the optical components of the OEU are formed by patterned lithography and/or etching in glass (or other optical material), possibly in conjunction with a variety of coating steps. Such processes are typically suitable for processing at "wafer scale" i.e. a relatively large (e.g. 3 inch to 6 inch diameter) wafer of glass or optical material may be lithographically patterned to define a large number of individual parts, each part being on the "chip" scale (such as around 1 mm to 5 mm, or smaller). All of the individual parts on the wafer may be processed simultaneously (etched, coated, etc.) leading to low-cost individual parts. Further cost reduction is provided by forming multiple optical elements 1804, 1806, 1808, 1810) on a single block 1802 using photolithographic or similar techniques, such that the relative positioning of the optical components on the block 1802 are predefined and provided with a high degree of precision. In this way, it is possible to avoid the cost of aligning individual optical elements during device fabrication (which can be an expensive procedure, particularly for small-scale devices such as devices having multiple optical elements on the scale of about 1 mm to 5 mm.

Preferably the OEU 326 is formed of a glass or plastic (e.g. polycarbonate, acrylic and the like) with the optics formed therein in predefined positions prior to assembly. Glass is preferred, when otherwise feasible, because it is relatively insensitive to temperature and water absorption (or other chemical attack) and can be joined to other components using higher temperature techniques such as solder reflow. In one embodiment, the OEU 1802 is joined to the periscope 1836 by an adhesive. Preferably, one or both of the interface surfaces such as the upper surface 1846 of the OEU 1802 has one or more channels or moats 2102, 2104 formed therein, e.g. by saw cuts or the like (FIG. 21). In one embodiment the width and depth of each moat is about 100 micrometers. In one technique, after the upper surface 1846 is placed in the desired alignment and position adjacent the lower surface of the prism or periscope 1836, an adhesive is introduced along the edges 2106, 2108 and allowed to "wick" or flow by capillary action, inwardly 2110, 2112. The moats 2102, 2104 receive any excess adhesive and prevent the adhesive from flowing inwardly substantially beyond the locations of the moats 2102, 2104 (since adhesive, inward of the moats 2102, 2104, could potentially interfere with the lenses 1810 or other optics).

In one embodiment, the optical die 326 is placed in the desired operable position with the aid of light from the laser diode 612. In this embodiment, the laser diode is connected to at least power and control circuitry prior to mounting of the optical die 326 and the silicon sub-mount 336 can be provided with power sufficient to provide the laser light output from the laser diode 612 and, optionally, to detect signals at a photo-diode or similar detector array (including those 3on the submount 1830). In one embodiment, positioning equipment for placing and mounting the optical die with respect to the submount 1830 involves monitoring characteristics of light 2T transmitted through one or both of the beam shaping optics 352a,b and/or servo optics 354 as the optical die 326 is moved and positioned. Preferably, the optical die 326 is mounted with respect to the spacers 332, 334 using well known techniques such as solder reflow. By using a procedure in which the optical die is positioned while light is being emitted from the laser (or other light source), and in which the position and/or focus or other characteristics of the light is used to guide optical-die-positioning equipment (preferably in a substantially automatic fashion, such as by using detected light to define a servo or control signal for the positioning equipment), the positioning of the optical die can at least partially compensate for various inaccuracies in the position of the laser (or other light source).

It is also possible to use an active alignment technique (i.e. using light from the laser to help in component placement, during fabrication) to at least partially compensate for inaccuracies in the relative position of the laser (or other light source) with respect to the photodector(s) 356. In one embodiment, after the optical die is positioned and fixed, the periscope block, preferably with the objective already mounted thereon, is positioned using active alignment. In one embodiment, a mirror is positioned near the objective (e.g. to mimic the reflection from the optical disk) and the periscope block is moved until the reflected light forms a desired or closest-fit pattern with respect to the photodetector(s). In at least one embodiment, it is believed that moving the periscope block is most feasible for positioning the reflected beam in a lateral direction (i.e. a direction perpendicular to the longitudinal axis of the optical arm). Accordingly, it is believed useful, in at least some embodiments, to select a type or configuration of photodetector(s) which is relatively insensitive to inaccuracies of beam placement in the longitudinal direction. In that way, the active alignment technique can be used to position the periscope block so as to provide the greatest accuracy of beam placement in the lateral direction, where the photodector(s) are most sensitive to inaccuracies.

Although it is possible, in some configurations, to position the optical die 326 prior to positioning of other components (such as the periscope 318, lens 312 and the like), in another embodiment, it is also possible to separately assemble some or all of the periscope 318 quarter wave plate 316, and/or lens 312 and the like to the optical die 326 prior to mounting the optical die 326 with respect to the spacers 332, 334. Regardless of the order in which the various components are aligned and mounted, embodiments of the present invention are believed to provide substantial benefits arising from employing wafer scale assembly techniques and/or multiple layer (stacking) assembly techniques to fabricate the optical head. By providing a relatively inexpensive and practical fashion for assembling an optical head to achieve a desired (and substantially static) alignment between components, the assembly of the entire drive 112 is simplified since critical alignment has already been performed during assembly of the optical head and relatively less critical or higher-tolerant assembly of the head to the arm 142 can be achieved, e.g., in a drive manufacturing or assembly plant at relatively low cost.

The periscope 318 is mounted, e.g., using solder reflow, adhesive or similar assembly techniques, to position the periscope mirror 322 in the desired position with respect to the optical die beam shaping optics 352ab so as to reflect the beam in a horizontal direction 358, i.e., substantially parallel to the data surface of the disk 362. The polarization beam splitter 324 is, in the depicted embodiment, substantially parallel to the periscope mirror 322 (i.e. substantially at about a 45° angle with respect to vertical) and may be formed by a coating (PBS coating) placed on a surface of a first block of the periscope 318 preferably with the coated surface mating with a surface of a end block 364 of the periscope 318. The PBS 324 is selected or applied in such a fashion that the PBS will be substantially reflective with respect to the polarization of laser light as it arrives at the PBS ("first polarization"). Those of skill in the art will understand how to select or control polarization or polarization beam splitters in this fashion.

Accordingly, the PBS reflects the laser beam in a vertically upward direction (i.e. towards the disk 362, 366). The beam travels through the quarter wave plate 316 and thence through an objective lens 312 aligned with the quarter wavelength by the lens mount 314. The objective lens 312 is configured to substantially provide the desired spot size (focus) with respect to the read/write surface of the (preferably first surface) disk 362.

Although a number of sizes and shapes of devices can be used in accordance with embodiments of the present invention, in the depicted device, the height 514 from the printed circuit board 338 to the lens 314 is about 2.9 mm. In one embodiment, the distance from the objective lens 312 to the surface of the disk 362 (defining the working distance for the optical system) is about 0.3 mm.

After reaching the disk 362, and depending on the portion of the disk illuminated and whether a data bit is present or absent at that position, light reflected from the disk 362 passes vertically downward to the objective lens 312 and quarter wave plate 316. At this point (e.g. because of passage twice through the quarter wave plate 316), polarization of the reflected light as it reaches the PBS coating is different from the first polarization and the PBS coating 324 is configured to allow substantially all of the reflected light to pass through the PBS coating and continue vertically downward, through the servo optics 354 and to the photo detector array 356.

A number of types of photo detector array can be used including quadrant detectors, φ detectors and the like, and the type of servo optics 354 will be selected corresponding to the type of detector being used, as will be understood by those of skill in the art after understanding the present disclosure.

In one embodiment, the substrate 1830 is provided with first and second ("A" and "B") optical detectors 2201, 2202 (FIG. 22) for detecting reflected light for use in providing focusing, tracking and/or data signals. In the depicted embodiment, each detector array includes three par-shaped parallel detectors 2211, 2212, 2213, 2221, 2222, 2223. One advantage of the detector configuration having three parallel, bar-shaped detectors in the detector array, is that the output is relatively insensitive to the placement of or position of the beam in a longitudinal direction 2210. This means that there is relatively higher tolerance, during fabrication, for misalignments of optical components (mounting of the laser 1832, OEU 1802, periscope 1836 and/or lens 1854) which results in movement or misalignment of the reflected beam (at the detectors) in the detector longitudinal direction 2210, compared to those misalignments that cause movement or misalignment with a substantial component in a lateral direction (perpendicular to the longitudinal direction 2210). Relaxing tolerance requirements for at least some alignment parameters can assist in lowering fabrication costs.

Figure 22:
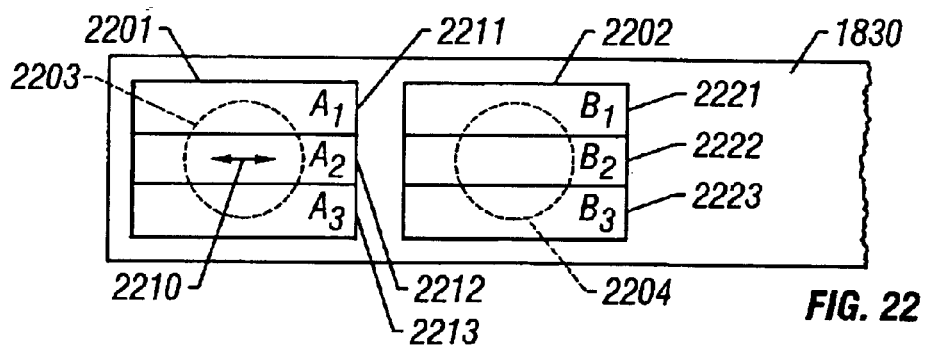
FIG. 22 is a top plan view of an optical detector portion of an optical head substrate, according to an embodiment of the present invention.
Figure 23:
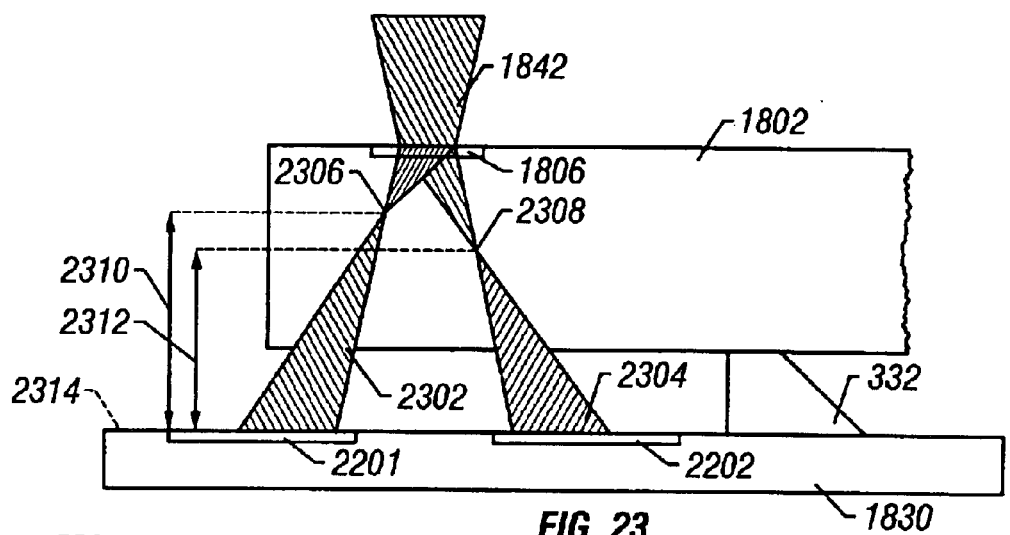
FIG. 23 is a side elevational view of the portion of the substrate of FIG. 22 combined with a corresponding portion of an Optical element unit (OEU), with selected light beams shown cross-hatched, for clarity, according to an embodiment of the present invention.

Providing a two-detector scheme 2201, 2202 permits the use of a differential detection approach. Differential detection generally provides improved performance compared to non-differential (single detector array) schemes, at least in terms of reduced cross-talk (tracking-to-focus cross-talk or offsets resulting from distorted beams), since differential schemes tend to reject common-mode noise between the detectors. In one embodiment, tracking-to-focus cross-talk is less than about 0.25 micrometers peak-to-peak (p—p), preferably less than about 0.1 micrometers p—p. In one embodiment, tracking-to-track cross-talk is less than about 5%, preferably less than about 2%. A two-detector scheme working configuration as shown in FIG. 22 can be implemented by providing an SOE 1806 configured for receiving the reflected ("return") light beam 1842 and creating first and second reflected beams 2302, 2304, e.g. as depicted in FIG. 23. As shown in FIG. 23, the first and second beams 2302, 2304 are directed so as to fall on regions of the first and second detectors 2201, 2202 (FIG. 22) respectively, defining first and second footprints of the beams 2203, 2204 thereon. Preferably, the first and second beams 2302, 2304 have different optical characteristics such as having different focal point or focal plane locations. It is possible to configure differential optical systems with the focal points of the first and second beams respectively on opposite sides of the detector plane 2314. In the embodiment of FIG. 23, however, both focal points 2306, 2308 are on the same side of the plane 2314 of the detectors 2202, 2201. The optical characteristics of the first and second beams 2302, 2304 differ by having the respective focal points 2306, 2308 at different locations, such as different distances, 2310, 2312, respectively, from the plane 2314 of the detectors. Providing different focal points 2306, 2308 of the first and second beams 2302, 2304 can be useful in a differential detection scheme for a number of reasons.

In one embodiment, a focus error signal ("FES") for each of the detectors 2201, 2202 is obtained by combining signals from each of three parallel bar-shaped detector regions in each of the detectors 2211, 2212, 2213, 2221, 2222, 2223. According to one embodiment, a focus error signal for the first or "A" detector 2201, termed "$FES_A$", is obtained by combining the negative or inverse of the signals from the outermost regions of the first array, i.e. $A_1$ 2211 and $A_3$ 2213 with the signal from the central region $A_2$ 2212. Expressed algebraically, $FES_A=A_2-(A_1+A_3)$. Similarly, in this embodiment, a focus error signal for the second detector 2202 can be expressed as $FES_B=B_2-(B_1+B_3)$. It can be seen that, in this fashion, each of the two FES signals from the two detectors 2201, 2202 is related to the size of the footprints of the beams 2203, 2204 which impinge on the detectors 2201, 2202. The size of the footprints 2203, 2204 will vary depending on the degree or amount of focus of the light spot on the medium 1856 (FIG. 18), e.g., in a pivot-focus apparatus, as the optical arm (or a portion thereof) pivots 224 (FIG. 2).

Figure 24A:
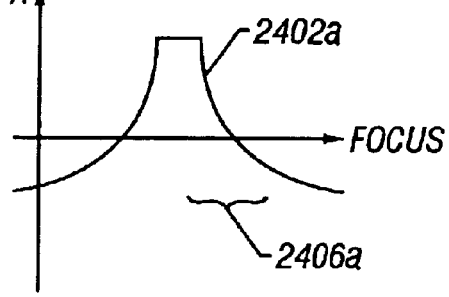
FIGS. 24A and B are graphs of Focus Error Signals (FES), as a function of focus at the medium, for first and second detectors, respectively, according to an embodiment of the present invention.
Figure 24B:
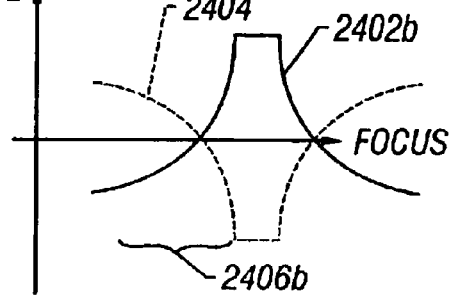
Figure 25:
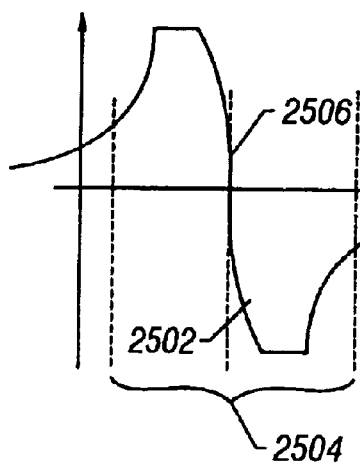
FIG. 25 is a graph of a differential Focus Error Signals (FES), as a function of focus at the medium, according to an embodiment of the present invention.

FIGS. 24A and 24B are graphs depicting the magnitude of the $FES_A$ and $FES_B$ signals 2402a, 2402b, respectively, as a function of the magnitude or degree of focus at the medium. In one aspect, focus can be expressed as the distance 1862 (e.g. in micrometers) of the objective lens from the information layer 1870 of the medium 1856. One effect of providing different distances 2310, 2312 for the focal points 2306, 2308 of the first and second beams 2302, 2304 is that the configuration of the FES signals from the two detectors 2201, 2204, as a function of focus are different, e.g. as can be seen by comparing FIGS. 24A and 24B. Each of the individual FES signals 2402a, 2402b is substantially non-linear (highly curved) in the regions 2406a, 2406b near the desired or nominal focus. Such non-linearity makes it relatively difficult and/or inaccurate to use either of the focus error signals $FES_A$, $FES_B$ alone, as a control signal for controlling focus. However, as depicted in FIG. 25, when the negative or inverse 2404 of the $FES_B$ signal 2402b is combined with the $FES_A$ signal 2402a, the resultant combined focus error signal $FES_A-FES_B$ 2502 is substantially linear in a capture range 2504 located about the nominal focus point 2506. Thus, the differential scheme as depicted, providing two different focus point distances, 2310, 2312 (in the depicted embodiment, both on the same side of the detector plane 2314) can assist in providing a substantially linear differential focus error signal, at least in a capture region 2504 which can be used for controlling a focus motor or actuator. In one embodiment, the capture region is the region within ±10 micrometers of the nominal focus. In one embodiment, the combined focus error signal $FES_A-FES_B$ 2502 has a maximum departure from linearity (e.g. departure from a best-fit linearity) at any point within the capture region of less than about 10%, preferably less than about 2%.

In a similar fashion, a combined tracking error signal can be defined as $TES=(A_1-A_3)+(B_1-B_3)$, and a combined data signal can be defined as $Data=(A_1+A_2+A_3+B_1+B_2+B_3)$. In one embodiment, the combined focus error signal TES has a maximum departure from linearity (e.g. departure from a best-fit linearity) at any point within the capture region of less than about 10%, preferably less than about 2%.

If desired, both the FES and TES can be normalized to the total power in each signal, e.g. to reduce the effect of a signal amplitude change (such as due to disk reflectivity differences or beam vignetting, e.g. over actuator stroke, or similar effects). For example, normalized FES and TES signals can be provided as $FES_{normal}=[(A_1+A_3-A_2)/(A_1+A_2+A_3)]-[(B_1+B_3-B_2)/(B_1+B_2+B_3)]$ and $TES_{normalized}=[(A_1-A_3)/(A_1+A_3)]+[(B_3-B_1)/(B_1+B_3)]$. The various combinations of signals from the regions of the two detectors can be combined in an analog or electronic fashion, or can be digitized and combined digitally (or a combination of both approaches).

In one embodiment, the relative size of the central element in each detector 2212, 2222 can be adjusted to reduce the cross-talk of the tracking signal TES into focus signals FES for different-detector positions with respect to the object lens and/or different groove geometries of the medium 1856 (on media with a groove) or different pit geometries on media with premastered pits.

Figure 6:
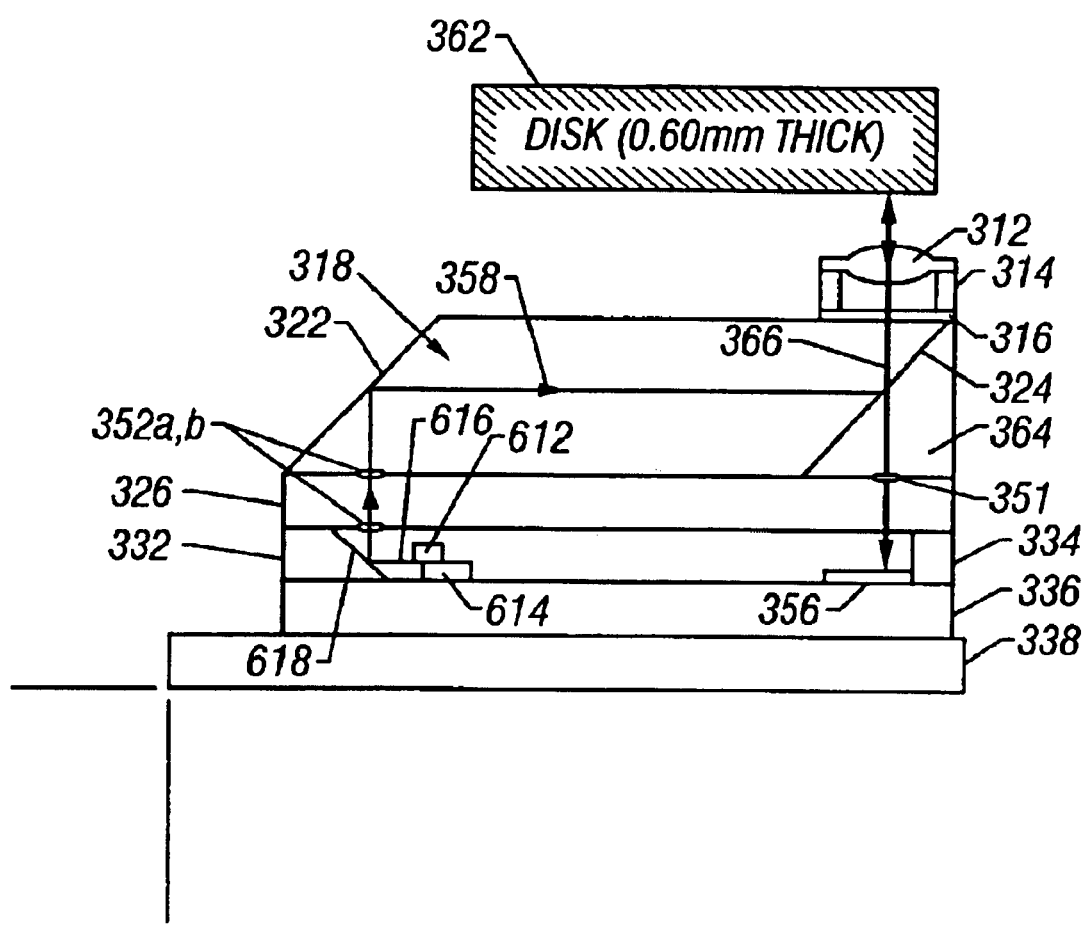
FIG. 6 is a cross sectional view through an optical head and a portion of an adjacent disk according to an embodiment of the present invention.
Figure 12:
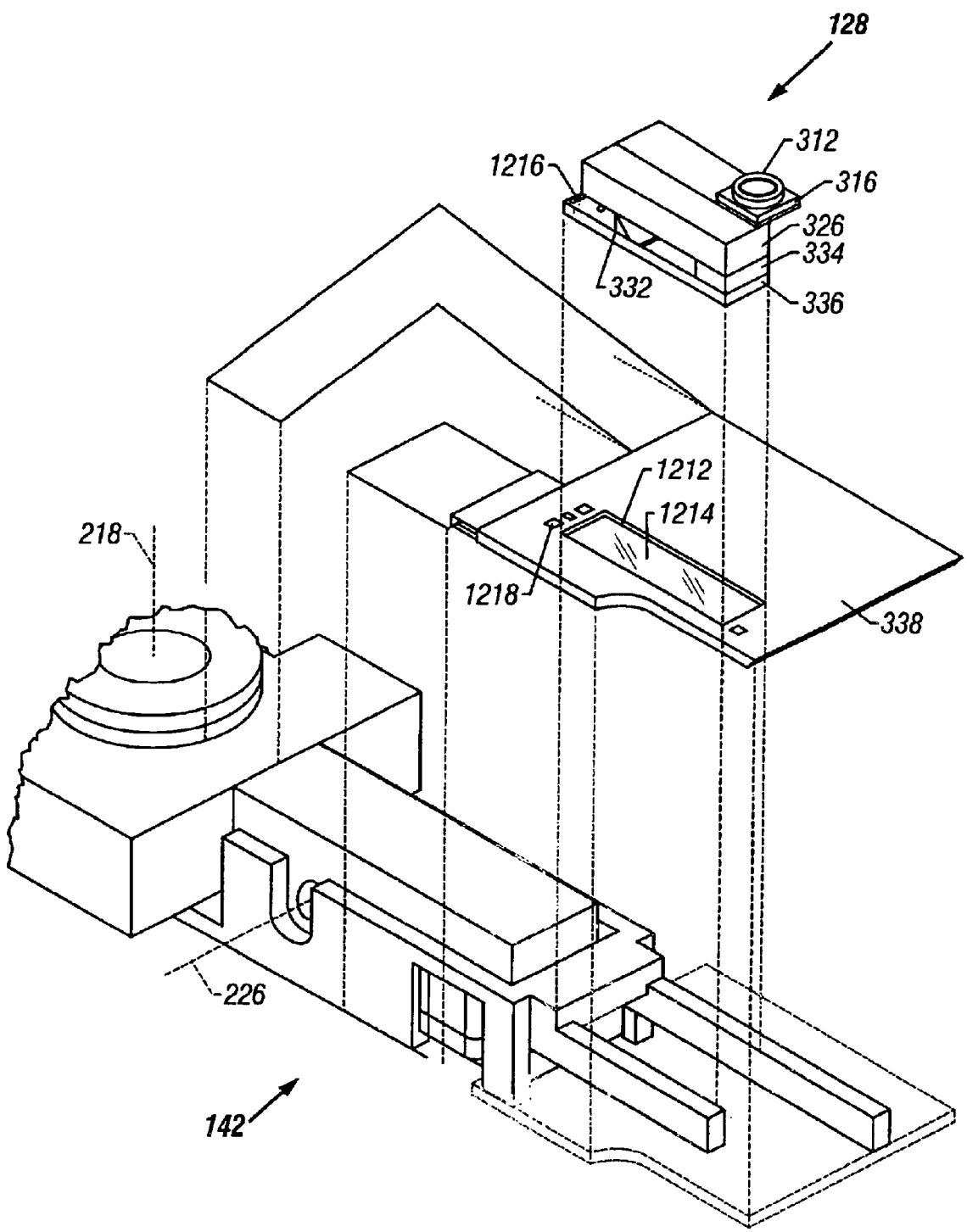
FIG. 12 is a partial exploded perspective view of an optics arm and optics head according to an embodiment of the present invention.

FIG. 12 illustrates one example of a manner of providing for communication of electrical signals to and from the optical head 128. Although the embodiment of FIG. 6 provided for the submount 336 to be positioned with respect to a printed circuit board 338, in the embodiment of FIG. 12, the submount 336 is accommodated in a cut-out 1212 formed in a flex circuit (e.g. a Kapton®-copper flex circuit) 338'. The flex circuit 338' is preferably electronically coupled to the optics head 318 such as by forming wire bonds between optics head bonding pads 1216 and flex circuit bonding pads 4218. The flex circuit 338' can be physically coupled e.g. by an epoxy or other adhesive, such as that sold under the tradename Epo-Tek H70E-2, available from Epoxy Technology, Inc. of Billerica, Mass. Some or all of the flex circuit or other components may be coated or encapsulated, e.g. for protection. The flex circuit 338' preferably contains some or all electronics used for control and/or signal processing for the optics head 128. Other manners of providing for electrical communications to and from the optics head will be understood by those of skill in the art after understanding the present disclosure.

One of the significant factors in design of devices, according to embodiments of the present invention, relates to thermal management. Many laser diodes or other light sources can be significant heat sources. In addition, many electrical or electronic components, such as power supplies or conditioners, resistors, diodes, and other items, can add to the total heat load. It would not be unexpected to use a laser device having a power output near 200 milliwatts. Elevated temperature can damage, or degrade performance, of electronic components and/or media, both in a drive, and in a PED or other device which incorporates a drive. Lasers and other components may have performance characteristics which change, sometimes radically, as a function of temperature, and it may be difficult or expensive to adequately compensate for such changes. Further, products which perceptibly generate heat may have reduced commercial appeal. Previous electronic or electro-optical devices commonly used relatively large, heavy or power-consuming components, such as large and/or heavy heat sinks, fans and the like. The present invention, however, is preferably a low-profile (or otherwise small) device and is especially suited to (although not necessarily limited to) use in connection with PEDs or other small, lightweight, low-power devices. Accordingly, it is preferred to configure the optical head in a fashion to avoid concentrations or quantities of heat an/or to avoid elevated temperatures which might harm equipment or components or which might degrade performance. Preferably, in at least one embodiment, at least a portion of the underside of the flex circuit 338' (preferably with the portion 1214 extending over some or all of the cut-out region 1212) has a coating or layer of a thermally conductive material, such as copper, e.g. to act as a heat sink or heat dissipater. In one embodiment, the submount 614 (if present) is formed of a substantially thermally conductive material, such as aluminum nitride or silicon carbide. The submount has a relatively large surface area (e.g. compared to the footprint of the laser diode 612 and/or mount 614) to effectively spread the heat, generated by the laser, over a relatively large surface area, avoiding concentrations of heat and undue (locally) elevated temperatures.

Figure 13:
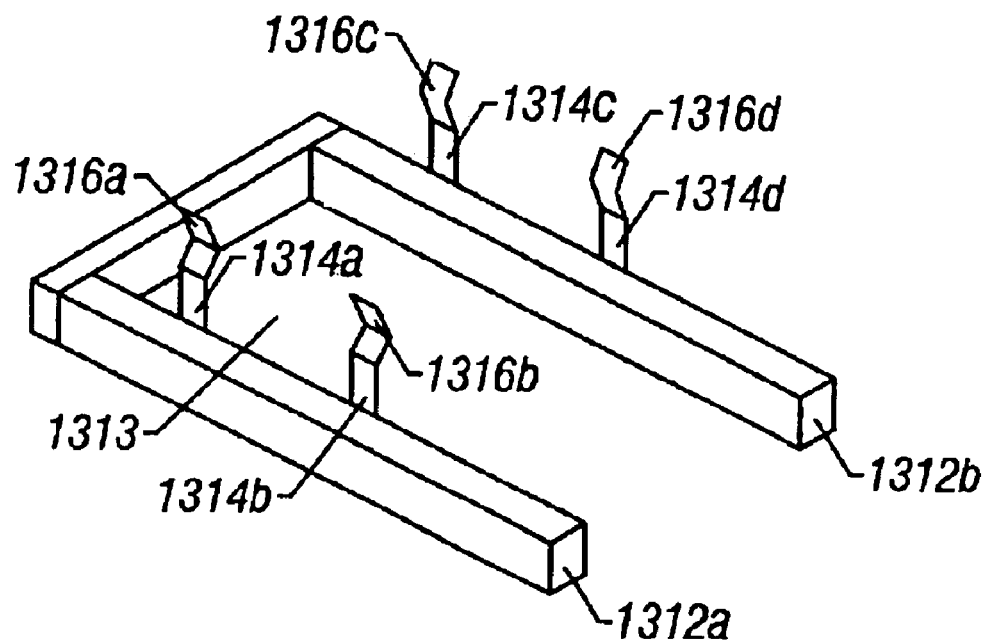
FIG. 13 is a partial perspective view of a portion of an optical arm with mounting prongs, according to an embodiment of the present invention.

In addition to provisions for thermal management and electronic coupling of the optics head 128 to the arm 142, embodiments of the present invention also include provisions for mechanical mounting or coupling of the optics head 128 with respect to the arm 142. In the embodiment depicted in FIG. 13, first and second arms 1312a, b define a region 1313 for receiving an optics head. A plurality of flexible prongs 1314a,b,c,d are coupled tho the arms. The prongs have angled protrusions 1316a,b,c,d configured to contact portions of the optics head when the head is in the region 1313. Once the optics head is positioned as desired (e.g. using mechanisms for gripping and moving the optics head), the protrusions can be fixed to portions of the optics head, e.g. using an adhesive, and preferably the prongs are stiffened or fixed, e.g. by coating with epoxy or other stiffening agent, possibly using an ultraviolet or other curing step.

Figure 14:
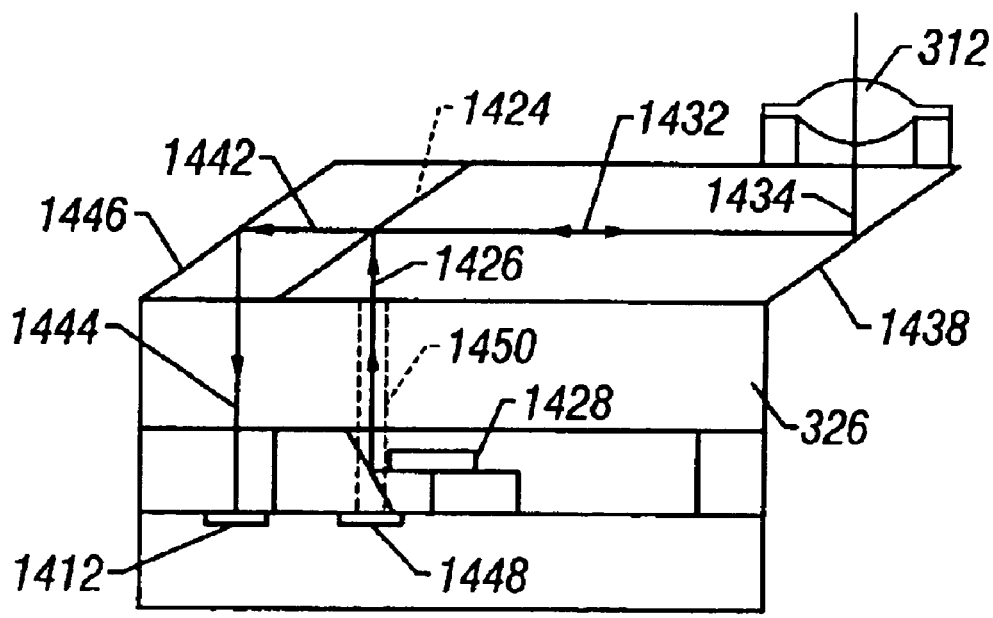
FIG. 14 is a vertical cross sectional view of an optical head according to an embodiment of the present invention.
Figure 15:
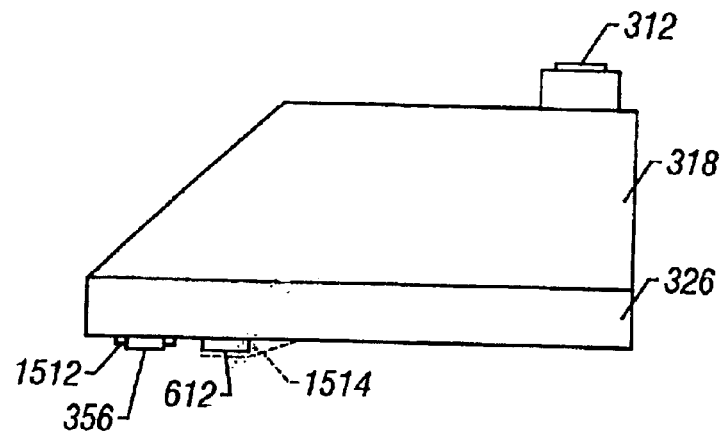
FIG. 15 is a side elevational view of components of an optical head with a laser mounted on a surface of the optical die, according to an embodiment of the present invention.

FIG. 14 depicts an embodiment of the invention in which the detector 1412 is positioned outwardly of the mirror block 332. In this embodiment the PBS 1424 is positioned and configured to substantially reflect the light 1426 received from the laser source 1428 to a horizontal path 1432. The light is then reflected to a vertical path 1434 toward the objective 312 by a reflective surface 1438. The reflected light returns along a similar path 1434, 1432, but, having a changed polarization, is transmitted through the PBS 1424 along a horizontal path 1442, to be reflected downward 1444 toward the detector 1412 by a reflective surface 1446. In one embodiment the undersurface of the optics block 326' in the region surrounding the path of the reflected beam 1444 is coated with an absorptive coating, such as non-reflective (black) chrome, to assist in protecting the detector 1412 from stray light. In one embodiment, an annular reflective coating is positioned on the lower surface of the optics block 326' surrounding the position of the central portion of the beam 1426 in order to reflect the outermost annular portion of the beam downward 1450 to a feedback detector 1448 for controlling laser power. Other regions can be coated with absorptive or reflective coatings for controlling stray light, as will be clear to those of skill in the art after understanding the present disclosure.

Figure 10:
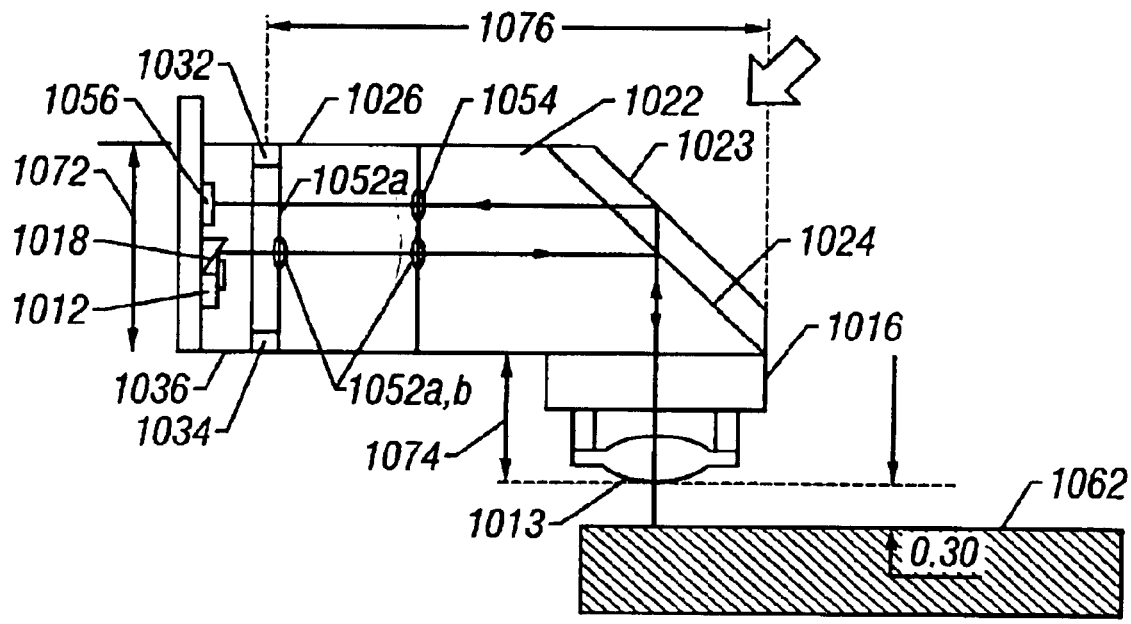
FIG. 10 is a vertical cross section through an optical head and a portion of an optical disk according one embodiment of the present invention.

Another embodiment of the invention is depicted in FIG. 10. While FIG. 10 shares some features with the embodiment of FIGS. 3–6, in FIG. 10 the silicon (or similar) sub-mount 1036 on which the laser 1012 and detector 1056 are mounted is positioned in a substantially vertical attitude, i.e. in a plane perpendicular to the surface or plane of the disk 1062. An optical die 1026 is mounted spaced from the sub-mount 1036 by spacers 1032, 1034 and the turning mirror 1018 is a separate structure. Light from the laser 1012 passes through beam-shaping optics 1052ab and into a mirror block 1022. The read/write beam is reflected by an interior PBS surface 1024, downward through a quarter wave plate 1016 and objective lens 1013 to the disk 1062. Reflected light, having its polarization altered, passes through the PBS 1024 and is reflected from a reflective surface 1023 through servo optics 1054 of the optics die 1026 to the photo detector 1056. Although a number of sizes and shapes of devices can be used in connection with the present invention, in one embodiment, the vertical height 1072 of the optics die 1026 and block 1022 is about 1.8 mm and the height 1074 of the quarter wave plate and mounted lens is about 1.02 mm. In one embodiment, the lateral dimension 1076 of the optics die 1026 and block 1022, about 4.0 mm.

Another embodiment of the present invention is depicted in FIG. 16. In the embodiment of FIG. 16, the laser 612 and the photodetector 356, rather than being mounted on a separate chip or submount, is mounted on the lower surface of the optical die 326. In the depicted embodiment, regions of the lower surface of the optical die 326 are selectively metalized or coated, e.g. to provide reflective or absorptive regions e.g. for surrounding the photodetector 1512 to control stray light, and/or to define regions for coupling the photodetector 356, laser 612 or other components or circuitry. In one embodiment one surface of the laser diode is used for coupling leads 1514 and the like to provide power, data or control signals to and from the laser 612. In one embodiment, the free surface of the laser 612 can be directly coupled to a heat sink (including, if desired some or all of the optical arm), for effective thermal management. The configuration of FIG. 16 can not only provide for effective thermal management, but, by avoiding the need for a silicon board 338 or submount 336, can reduce the vertical height requirements, further promoting the low-profile nature of the optical head.

Figure 26:
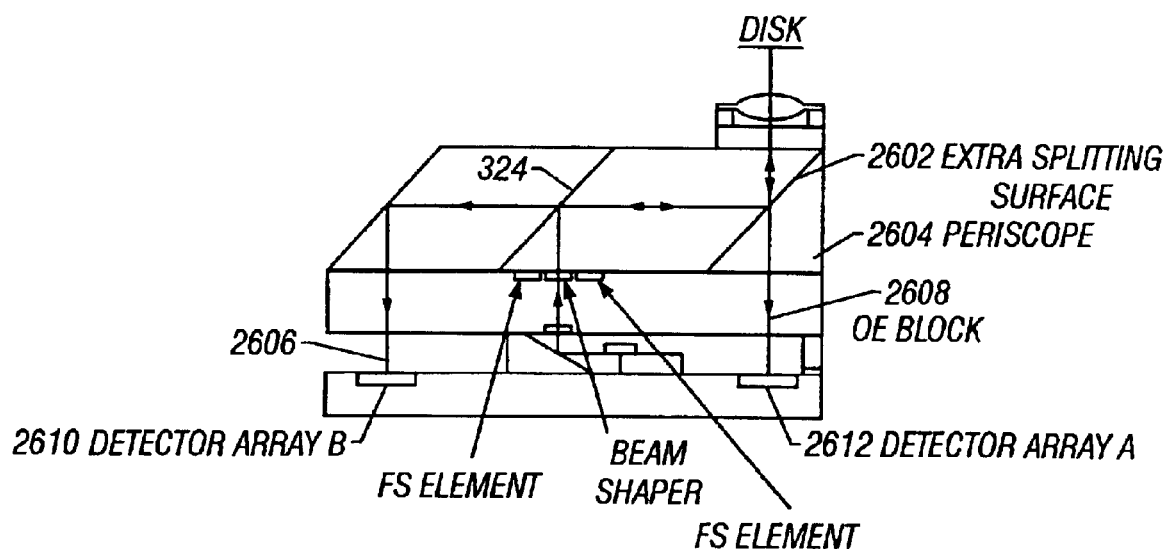
FIG. 26 is a side elevational view of an optical head, with arrows showing the paths of central axes of selected light beams, according to an embodiment of the present invention.
Figure 27:
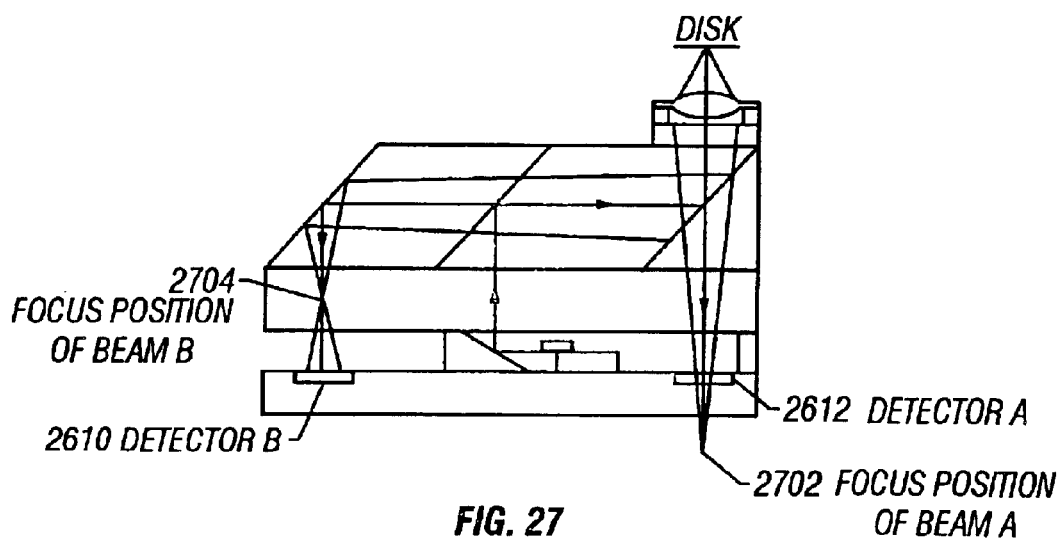
FIG. 27 is a side elevational view of an optical head, with arrows showing the paths of selected light beams, according to an embodiment of the present invention.

Another embodiment of the invention is depicted in FIG. 26. In the embodiment of FIG. 26, a second beam splitting surface 2602 is provided as part of the periscope 2604 to provide for creation of first and second reflected beam paths 2606, 2608 for impinging on first and second detector arrays 2610, 2612. The embodiment of FIG. 26 can be compared with the embodiment of FIGS. 18 and 23. In FIG. 23, the SOE optic 1806 performs two functions: splitting the reflector beam 1842 into first and second beams 2302, 2304 and providing two different focus point distances 2310, 2312. Since the extra beam splitting surface 2602 (combined with the effect of the original beam splitting surface 324) results in two spatially-separated reflected beams 2606, 2608, it is not longer necessary to provide servo optics configured for performing a beam splitting function of the type depicted in FIG. 23. If desired, it is also possible to dispense with modifying or changing the optical power applied to the two reflected or return beams 2606, 2608 (thus making it possible to eliminate, altogether any need for servo optics or other optic devices for the return or reflected beam paths 2606, 2608). For example, differential size measurement can be arranged as depicted in FIG. 27 showing one returning beam forming a virtual focus 2702 beyond the detector array 2612 and the second returning beam forming a real focus 2704 before the second detector array 2610. Since these foci 2704, 2702 are natural images of the spot at the disk (at the same distance from the disk as the apparent laser source point), no additional focusing power is needed and thus the SOE may be eliminated.

One advantage of eliminating an SOE (e.g. such as in the embodiment of FIGS. 26 and 27) is to assist in correction of laser pointing errors. When an OEU contains both outgoing beam shaper optics 1808, 1810 (FIG. 18) and returning or reflected beam optics 1806, adjustment of the OEU 1802, e.g. in order to correct a laser pointing error, will also move the SOE 1806. Such movement of the SOE 1806 can cause error (potentially uncorrectable) in registration of the SOE 1806 and the detector arrays 1844. If the SOE element 1806 can be eliminated, it is possible to adjust the mounting position of the OEU 1802, (e.g. to correct laser pointing errors) without also moving an SOE element. Any detector alignment required can be performed by other means, such as translation of the objective lens 1854.

In light of the above description, a number of advantages of the present invention can be seen. The present invention includes a recognition that a small spot size compatible with high data density (e.g. as facilitated by use of a first surface medium) makes it feasible to provide substantially all optical components in a small and/or lightweight package, e.g., such that tracking and/or focus can be performed by moving the entire optics package or head (as opposed to, e.g., moving just the objective lens). The present invention provides a device which is not only sufficiently small and lightweight to maintain all of the optics components in fixed positions with respect to one another, but also to provide these components with spatial extends in various directions, such as providing a small vertical (low profile) optical head so as to be compatible with the form factors of a type consistent with use in small and/or portable drives or host devices, e.g., personal electronic devices. The present invention can provide an optical head which is highly efficient such as by using an optical design which substantially avoids overfilling or otherwise spilling optical or other energy. The present invention provides a design in which some or all steps of fabrication can be performed in a relatively inexpensive fashion such as using techniques from wafer-scale fabrication technology and/or using a planar or stacking technique for assembling the optical head. One characteristic of an optical device such as that disclosed herein which contains multiple optical elements on various surfaces of one or more optical blocks, is that the substantial majority of the optical path link from the laser source to the objective is through a solid (glass or other) medium, with only a minor portion being through air. In one embodiment, the percentage of the optical path from the laser source to the objective lens which is in a glass or other solid medium (as opposed to being through air) is greater than about 50 percent, preferably greater than about 75 percent, and more preferably greater than about 85 percent. In one embodiment, of a total optical path length (from the laser to the objective lens) of about 5500 micrometers, about 5000 micrometers of the path link is through the glass (or other solid) substance (e.g., the optical block 1802 and periscope 1836). About 450 micrometers of the total optical path is through air from the laser to the OEU 1802, with other portions of the path, through air, potentially occurring at the interface between the optical block 1802 and periscope 1836 and/or between the periscope 1836 (or quarterwave plate 316) and objective lens 1854.

Figure 17:
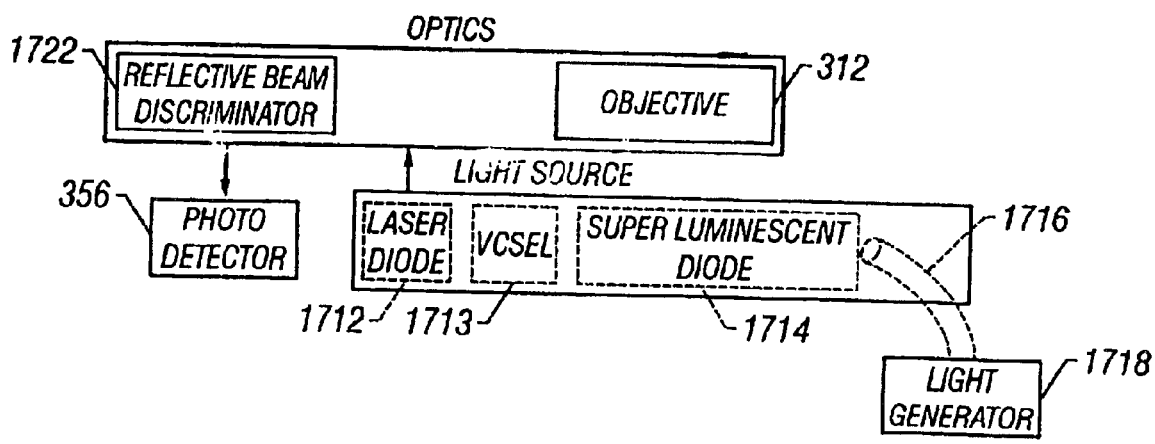
FIG. 17 is a block diagram depicting components that can be uses in providing various embodiments of the present invention.

A number of variations and modifications of the present invention can be used. It is possible to use some aspects of the invention without using others. For example, it is possible to provide an optical head which is sufficiently small and/or lightweight that it becomes feasible to move the entire optical head (e.g. for tracking and/or focus) without using the wafer-scale and/or stacking fabrication techniques described herein. In one embodiment, some or all of the optics depicted as being provided in, or on, a separate optics die 326 can be formed in or on the periscope or optical block 322, thus potentially making it possible to provide embodiments of the present invention do not require providing or assembling a separate optical die 326 (i.e. placing a combined prism/optics component directly on the spacers 322, 324). Similarly, although embodiments are depicted in which substantially all optical elements (other than, perhaps, the objective lens and quarterwave plate) are formed in or on two units (the optical element unit and the periscope), it is possible to implement the present invention using three or more units to provide the optical elements. Although in embodiments depicted herein, a polarization beam splitter was used for discriminating emitted and reflected light, other techniques or devices for discriminating emitted and reflected light 1722 (FIG. 17) can be used including diffraction gratings, as will be understood by those of skill in the art after understanding the present disclosure. Although embodiments have been described in which a periscope application provides two changes of direction (vertical to horizontal and horizontal to vertical) (which can be of use in reducing the height profile, without unduly limiting optical path length). It is also possible to provide configurations in which multiple internal reflections between (typically parallel) surfaces (such as three or more) are used, e.g. for reducing an optical head profile. In some embodiments it may be preferable to configure the system such that the periscope prism (or other components of the stacked optical head) are substantially symmetric in configuration (e.g. to enhance manufacturability). Although embodiments have been described in which substantially all optics components of the optics head are fixed with respect to one another, it is also possible to provide operable configurations in which some components are movable. For example, it is possible to construct an operable device in which the objective lens is movable with respect to one or more components of the optics head, e.g. for fine (or coarse) focus, tracking or the like. Although embodiments have been described in which wafer-scale and/or stacking approaches are used, it is also possible to provide some or all optical components using integrated optics techniques, as will be understood by those of skill in the art after understanding the present invention. Although the optics head with a periscope sections and/or with substantially all components being relatively non-movable has been described in connection with a device in which tracking is provided by rotation of an optics arm about an axis parallel to the spin axis, it is also possible to configure a device in which an optics head substantially as described herein is moved in other fashions, such as providing rails or similar devices for achieving linear (e.g. radial) tracking motion of the optical head. Although embodiments are described herein which have a diode 1712 (FIG. 17) or other laser as a light source, it is possible to provide embodiments of the present invention which use non-laser light, such as providing a superluminescent diode 1714, an incandescent, flourescent, arc, vapor or other light source. It is possible to provide, as the light source which is in the optical head, a light delivery component, such as the output 1716 of a fiber optic or other light conveyance device, which delivers, in or to the optical head, light generated by a laser or other light generator 1718 which may, if desired, be positioned remote from the optical head. Use of a fiber optic can assist in thermal management (e.g. by permitting a laser to be mounted remote from the optical head) and/or providing for circularizing a light beam.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An optical head for use in a optical read/write apparatus for use with a read/write medium comprising:

a light source, outputting light at an initial light output location;

at least a first photodetector array mounted in a fixed position with respect to said initial light output location, said first photodetector array having at least a first surface defining a photodetector plane; and an optical element unit, mounted in a fixed position with respect to said light output location, said optical element unit having a first beam shaping optical element and second beam shaping optical element which receive light output at said light output location to modify the angular divergence of the light output, said optical element unit including at least a third optical element configured for directing at least a portion of light reflected from said medium along a path for arrival at said first photodetector array;

said optical head providing at least a first optical path, where said first optical path originates at said initial light output location and reaches at least said read/write medium.

2. Apparatus as claimed in claim 1, wherein said optical element unit has first and second opposite surfaces and wherein said first and second beam-shaping optical elements are formed in said first and second surfaces respectably.

3. Apparatus as claimed in claim 1, wherein said optical element unit further comprises at least a fourth optical element configured to provide a first focal plane for at least a first portion of light reflected from said medium, said first focal plane spaced a first distance from first photodetector array.

4. Apparatus as claimed in claim 3, wherein optical elements provided in said optical element unit are further configured to provide a second beam from at least a portion of said light reflected from said medium, said second beam impinging on a second photodetector array, spaced from said first photodetector array.

5. Apparatus as claimed in claim 4, wherein said second beam has a second focal plane spaced a second distance from said second photodetector array.

6. Apparatus as claimed in claim 5, wherein said second distance is different from said first distance.

7. Apparatus as claimed in claim 5, wherein said first focal plane and said second focal plane are on the same side of said photodetector plane.

8. Apparatus as claimed in claim 5, wherein said first and second focal planes are on opposite sides of said photodetector plane.

9. Apparatus as claimed in claim 5, wherein said first photodetector and said second photodetector arrays are substantially co-planer.

10. Apparatus as claimed in claim 1, further comprising a second optical block mounted in a fixed position with respect to said optical element unit, said second optical block configured to at least partially fold said first optical path to define at least a portion of said first optical path which is non-vertical.

11. Apparatus as claimed in claim 10, wherein said second optical block includes at leant a first beam splitter for directing at least a first portion of said light reflected from said medium along a second path having at least a portion different from said first optical path.

12. Apparatus as claimed in claim 11, wherein said second optical block comprises a second beam splitter.

13. Apparatus as claimed a claim 12, wherein at least one of said first and second beam splitters is a polarization beam splitter.

14. Apparatus as claimed in claim 1, wherein said optical element unit is provided in the absence of optical elements configured to change a focal plane of light reflected from said medium.

15. Apparatus as claimed in claim 1, wherein optical element unit further includes at least a first forward sense optical element configured for directing at least a portion of light from said first optical path to a forward sense detector.

16. Apparatus as claimed in claim 15, further comprising circuitry for using a signal from said forward sense detector to control a power level of said light source.

17. Apparatus as claimed in claim 1, further comprising a coating on at least a portion of at least a fat surface of said optical element unit.

18. Apparatus as claimed in claim 17, wherein said coating is a substantially reflective coating.

19. Apparatus as claimed in claim 17, wherein said coating is a substantially absorptive coating.

20. Apparatus as claimed in claim 17, wherein said coating is positioned to reduce incidence of stray light at said photodetector.

21. Apparatus as claimed in claim 17, wherein said coating is an anti-reflective coating.

22. Apparatus as claimed in claim 1, wherein said optical element unit has at least a first alignment marking positioned on at least a first surface of said optical element unit.

23. Apparatus as claimed in claim 1, wherein said light source is an edge-emitter laser.

24. Apparatus as claimed in claim 1, wherein said light source is a VCSEL.

25. Apparatus as claimed in claim 1, wherein said light source is a blue-light laser.

26. Apparatus as claimed in claim 10, wherein at least a first surface of said optical element unit, adjacent said second optical block includes at least a first moat region formed therein, adjacent at least a portion of an edge of said surface.

27. Apparatus as claimed in claim 26, wherein said moat receives at least a portion of adhesive introduced along said edge, said adhesive extending inwardly from said in edge no farther than said moat.

28. Apparatus as claimed in claim 1, further comprising an objective lens defining rim intensities at each perimeter location of a rim of said objective lens, with respect to a central light intensity, wherein said rim intensity is less than about 80% in a tangential direction.

29. Apparatus as claimed in claim 1, further comprising an objective lens defining rim intensities at each perimeter location of a rim of said objective lens, with respect to a central light intensity, wherein said rim intensity is less than about 80% in a radial direction.

30. Apparatus as claimed in claim 1, further comprising an objective lens defining rim intensities at each perimeter location of a rim of said objective lens, with respect to a central light intensity, wherein said rim intensity is greater than about 50% in a tangential direction.

31. Apparatus as claimed in claim 1, further comprising an objective lens defining rim intensities at each perimeter location of a rim of said objective lens, with respect to a central light intensity, wherein said rim intensity is greater than about 15% in a radial direction.

32. Apparatus as claimed in claim 1, wherein greater than 50% of a path length of said first optical path is within a solid structure and less than 50% of said path length of said first optical path is in air.

\* \* \* \* \*